United States Patent
Park et al.

(10) Patent No.: US 10,187,851 B2
(45) Date of Patent: Jan. 22, 2019

(54) METHOD AND DEVICE FOR OPERATION BASED ON POWER SAVE MODE IN WLAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 58 days.

(21) Appl. No.: 15/315,702

(22) PCT Filed: Feb. 26, 2015

(86) PCT No.: PCT/KR2015/001897
§ 371 (c)(1),
(2) Date: Dec. 1, 2016

(87) PCT Pub. No.: WO2015/186892
PCT Pub. Date: Dec. 10, 2015

(65) Prior Publication Data
US 2017/0127352 A1 May 4, 2017

Related U.S. Application Data

(60) Provisional application No. 62/019,896, filed on Jul. 2, 2014, provisional application No. 62/006,270, filed on Jun. 2, 2014.

(51) Int. Cl.
*H04W 52/02* (2009.01)
*H04W 84/12* (2009.01)

(52) U.S. Cl.
CPC ... *H04W 52/0225* (2013.01); *H04W 52/0216* (2013.01); *H04W 84/12* (2013.01);
(Continued)

(58) Field of Classification Search
CPC .. H04W 52/0245; H04W 84/12; H04L 5/0055
See application file for complete search history.

(56) References Cited

U.S. PATENT DOCUMENTS

2007/0211654 A1  9/2007  Kim et al.
2012/0188923 A1  7/2012  Kwon et al.
(Continued)

FOREIGN PATENT DOCUMENTS

JP   2013513285   4/2013
JP   2013522947   6/2013
(Continued)

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.9., pp. 473-474 (3 pages provided).
(Continued)

*Primary Examiner* — Jae Y Lee
(74) *Attorney, Agent, or Firm* — Lee Hong Degerman Kang Waimey

(57) ABSTRACT

Disclosed are a method and a device for operation based on a power save mode in a WLAN. The method for operation based on a power save mode may comprise steps in which: an STA, which has been switched to an awake state, transmits a PS-poll frame to an AP on the basis of the transmission cycle of a beacon frame; the STA receives an ACK frame from the AP in response to the PS-poll frame; after receiving the ACK frame, the STA overhears a different BSS frame; and within a preset time upon overhearing the different BSS frame, the STA determines whether or not to maintain the awake state on the basis of whether or not a
(Continued)

power management control frame has been transmitted from the AP.

6 Claims, 15 Drawing Sheets

(52) U.S. Cl.
CPC .... *H04W 52/0235* (2013.01); *H04W 52/0245* (2013.01); *Y02D 70/00* (2018.01); *Y02D 70/142* (2018.01); *Y02D 70/22* (2018.01)

(56) References Cited

U.S. PATENT DOCUMENTS

| | | | |
|---|---|---|---|
| 2013/0121160 | A1 | 5/2013 | Chung et al. |
| 2015/0341880 | A1* | 11/2015 | Seok ................ H04W 52/0216 370/350 |

FOREIGN PATENT DOCUMENTS

| | | | |
|---|---|---|---|
| KR | 1020120086110 A | | 8/2012 |
| KR | 101234262 B1 | | 2/2013 |
| KR | 1020130052098 A | | 5/2013 |
| KR | 101351573 B1 | | 2/2014 |
| WO | 2012046951 | | 4/2012 |
| WO | WO 2013/119095 | * | 8/2013 |
| WO | 2014084495 A1 | | 6/2014 |

OTHER PUBLICATIONS

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.10., pp. 474-477(5 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.11., pp. 478-479 (3 pages provided).

"IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Draft P802.11-REVmb™/D12, Nov. 2011, section 8.3.3.5.-8.3.3.6., pp. 467-468 (3 pages provided).

PCT International Application No. PCT/KR2015/001897, International Search Report dated May 28, 2015, 2 pages.

Japan Patent Office Application No. 2016-570885, Office Action dated Dec. 26, 2017, 3 pages.

\* cited by examiner

FIG. 1
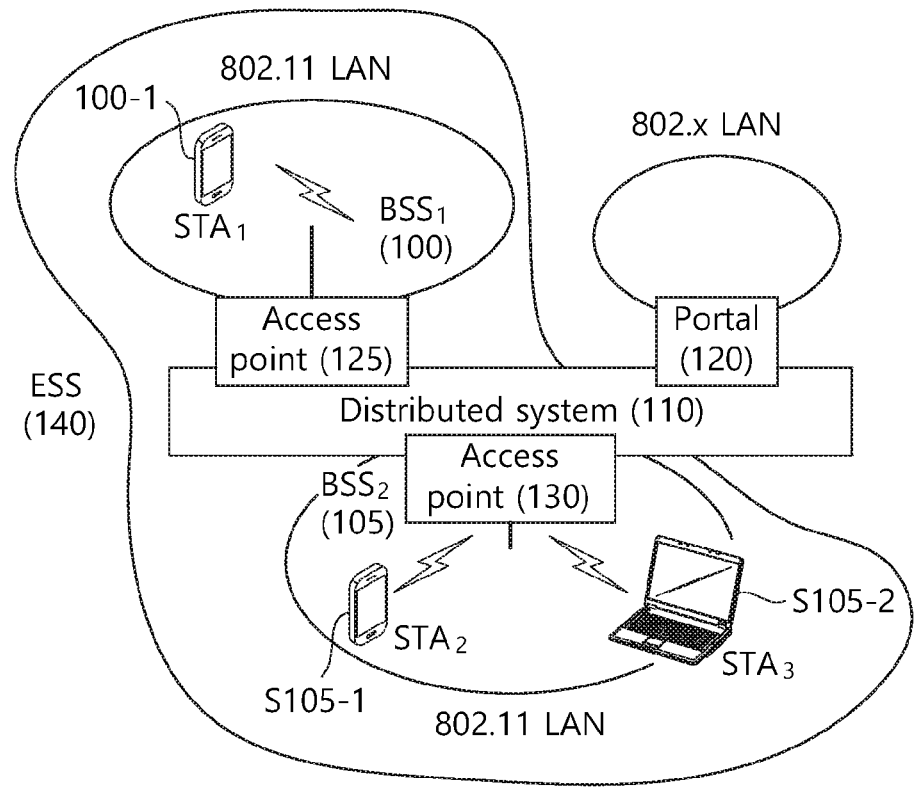
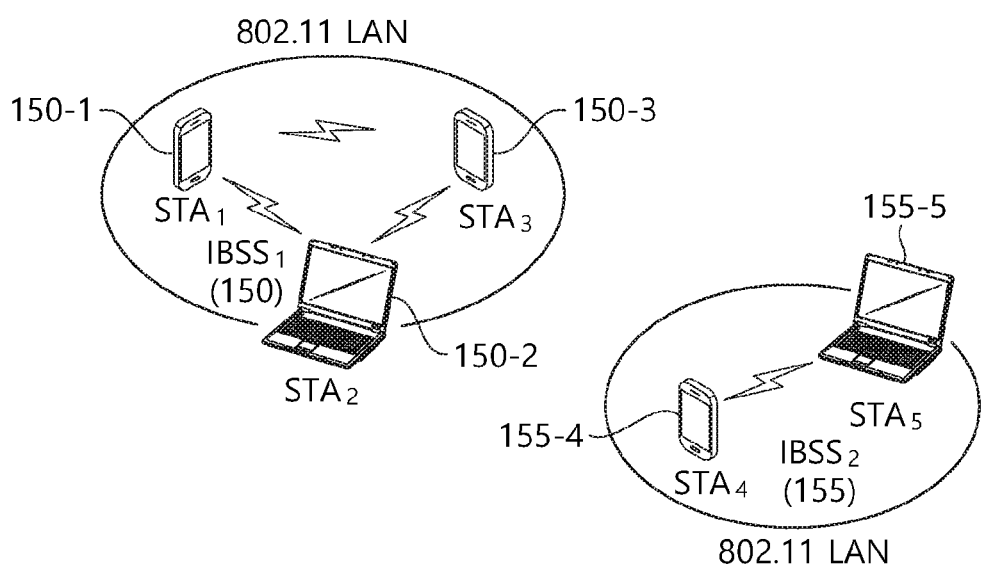

METHOD AND DEVICE FOR OPERATION BASED ON POWER SAVE MODE IN WLAN

CROSS-REFERENCE TO RELATED APPLICATIONS

This application is the National Stage filing under 35 U.S.C. 371 of International Application No. PCT/KR2015/001897, filed on Feb. 26, 2015, which claims the benefit of U.S. Provisional Applications No. 62/006,270, filed on Jun. 2, 2014 and 62/019,896 filed on Jul. 2, 2014, the contents of which are all hereby incorporated by reference herein in their entirety

BACKGROUND OF THE INVENTION

Field of the Invention

The present invention relates to wireless communication and, more particularly, to a method and apparatus for an operation based on a power save mode in a wireless local area network (WLAN).

Related Art

An IEEE 802.11 standard provides a power save mechanism (or power save mode) to increase the lifespan of a wireless local area network (WLAN) station (STA). The STA operating based on the power save mode may operate in an awake state or a doze state for power saving. The awake state is a state which enables a normal operation of the STA such as frame transmission or reception, channel scanning, etc. On the other hand, the doze state is a state in which power consumption is extremely reduced and thus frame transmission or reception and channel scanning are impossible. In a case where the STA usually operates in the power save mode, the STA is in the doze state and, when necessary, transitions to the awake state, thereby reducing power consumption.

If the STA operates for a long time in the doze state, power consumption of the STA is reduced. Therefore, the lifespan of the STA may be increased. However, frame transmission or reception is impossible in the doze state. Therefore, the STA cannot stay for a long time in the doze state. If a pending frame is generated in the doze state, the STA may transition to the awake state to transmit the frame to an access point (AP). However, if the STA is in the doze state and a pending frame to be transmitted to the STA exists in the AP, the STA cannot receive the pending frame from the AP, and cannot know that the pending frame exists in the AP. Therefore, the STA may acquire information regarding the presence/absence of the pending frame in the AP, and may operate by periodically transitioning to the awake mode in order to receive the pending frame in the AP.

The AP may acquire information regarding awake mode operating timing of the STA, and may transmit the information regarding the presence of the pending frame in the AP according to the awake mode operating timing of the STA.

More specifically, in order to receive information regarding the presence/absence of a frame to be received from the AP, the STA may periodically transition from the doze state to the awake state to receive a beacon frame. The AP may report the presence/absence of a frame to be transmitted to each STA on the basis of a traffic indication map (TIM) included in the beacon frame. The TIM is used to report the presence of a unicast frame to be transmitted to the STA, and a delivery traffic indication map (DTIM) may be used to report the presence of a multicast frame/broadcast frame to be transmitted to the STA.

SUMMARY OF THE INVENTION

An object of the present invention is to provide a method operating based on a power save mode in a wireless local area network (WLAN).

Another object of the present invention is to provide an apparatus operating based on a power save mode in a WLAN.

An operation method based on a power save mode in a WLAN according to an aspect for achieving an object of the present invention includes the steps of transmitting, by a station (STA) which has switched to an awake state based on the transmission cycle of a beacon frame, a power saving (PS)-poll frame to an access point (AP), receiving, by the STA, an acknowledgement (ACK) frame from the AP as a response to the PS-poll frame, overhearing, by the STA, another basic service set (BSS) frame after receiving the ACK frame, and overhearing, by the STA, the another BSS frame and determining whether or not to maintain the awake state based on whether a power management control frame has been transmitted by the AP within a predetermined time. The ACK frame may include information indicating the transmission of the power management control frame, the another BSS frame may be a frame transmitted by another BSS other than a BSS including the AP and the STA, and the power management control frame may include information indicating whether or not to maintain the awake state of the STA.

A station (STA) operating based on a power save mode in a WLAN according to an aspect for achieving another object of the present invention includes a radio frequency (RF) unit implemented to transmit or receive a radio signal and a processor operatively connected to the RF unit. The processor is implemented to determine switching to an awake state based on the transmission cycle of a beacon frame and transmit a power saving (PS)-poll frame to an access point (AP), receive an acknowledgement (ACK) frame from the AP as a response to the PS-poll frame, overhear another basic service set (BSS) frame after receiving the ACK frame, and determine whether or not to maintain the awake state based on whether a power management control frame has been transmitted by the AP within a predetermined time after overhearing the another BSS frame. The ACK frame may include information indicating the transmission of the power management control frame, the another BSS frame may be a frame transmitted by another BSS other than a BSS including the AP and the STA, and the power management control frame may include information indicating whether or not to maintain the awake state of the STA.

An STA operating in a power save mode based on a traffic indication map (TIM) can switch to a doze state based on the transmission intensity of a frame transmitted by another BSS. Accordingly, power of an STA can be reduced and the operation time of an STA operating based on the battery can be increased.

BRIEF DESCRIPTION OF THE DRAWINGS

FIG. 1 is a conceptual diagram showing the configuration of a wireless local area network (WLAN).

DESCRIPTION OF EXEMPLARY EMBODIMENTS

Figure 2:
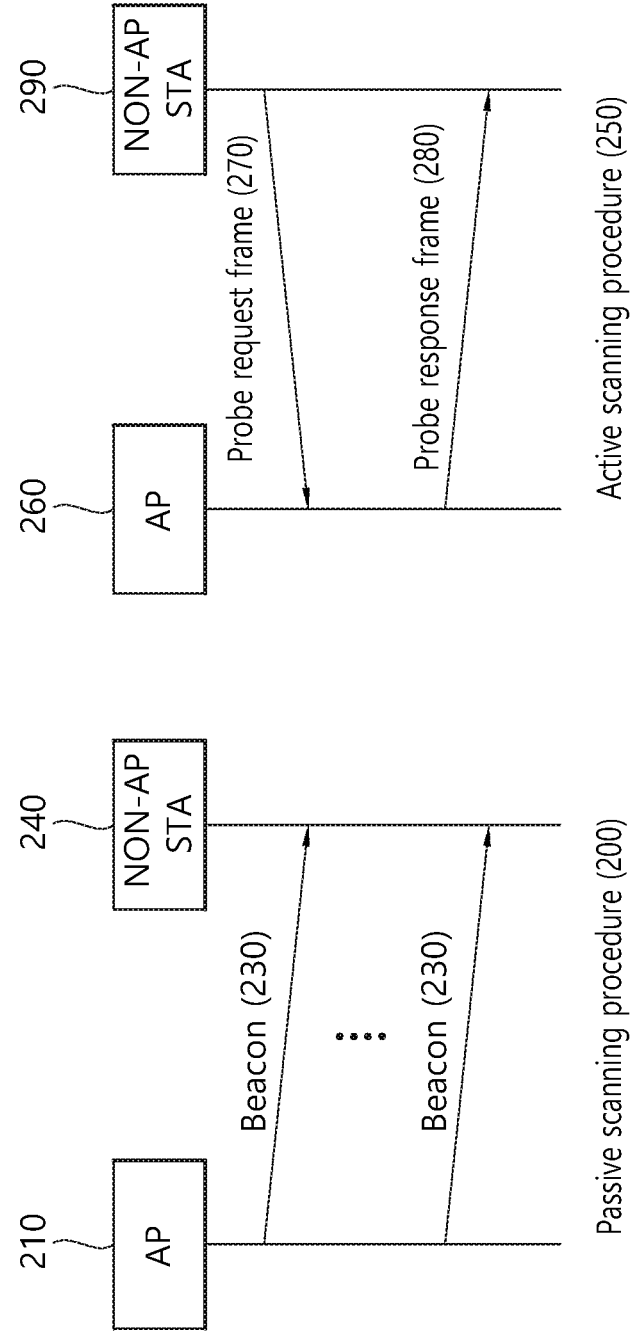
FIG. 2 is a conceptual diagram showing a scanning method in a WLAN.

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs) 100 and 105. The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the Institute of Electrical and Electronics Engineers (IEEE) 802.11 standards and that includes a physical layer interface for radio media, and the term "STA" may, in its definition, include both an AP and a non-AP station (STA).

The STA may be referred to by various terms such as a mobile terminal, wireless device, wireless transmit/receive unit (WTRU), user equipment (UE), mobile station (MS), mobile subscriber unit or simply referred to as a user.

Hereinafter, in an embodiment of the present invention, data (or a frame) to be transmitted from the AP to the STA may be expressed by the term 'downlink data (or a downlink frame)', and data (or a frame) to be transmitted from the STA to the AP may be expressed by the term 'uplink data (or an uplink frame)'. In addition, transmission from the AP to the STA may be expressed by the term 'downlink transmission', and transmission from the STA to the AP may be expressed by the term 'uplink transmission'.

FIG. 2 is a conceptual view showing a scanning method in a wireless LAN.

Referring to FIG. 2, the scanning method may be divided into passive scanning 200 and active scanning 250.

Referring to the left side of FIG. 2, passive scanning 200 may be performed by a beacon frame 230, which is periodically broadcasted by an AP 210. The AP 210 of the wireless LAN broadcasts a beacon frame 230 to a non-AP STA 240 at each specific interval (e.g., 100 msec). Information on the current network may be included in the beacon frame 230. By receiving the beacon frame 230 that is periodically broadcasted, the non-AP STA 240 receives the network information and may perform scanning on the AP 240, which will be performing the authentication/association procedure, and the channel.

The passive scanning method 200 may be performed by simply receiving the beacon frame 230 that is being transmitted from the AP 210 without requiring the non-AP STA 240 to transmit any frames. Therefore, the passive scanning 200 is advantageous in that the overall overhead, which occurs due to the transmission/reception of data within the network, is small. However, since the scanning process can only be performed manually in proportion to the cycle of the beacon frame 230, passive scanning 200 is disadvantageous in that the time consumed for performing the scanning process is relatively longer in comparison with the active scanning method. Detailed description on the beacon frame is disclosed in 8.3.3.2 beacon frame of the IEEE Draft P802.11-REVmb™/D12, November 2011 'IEEE Standard for Information Technology Telecommunications and information exchange between systems—Local and metropolitan area networks—Specific requirements Part 11: Wireless LAN Medium Access Control (MAC) and Physical Layer (PHY) Specifications (hereinafter referred to as IEEE 802.11)', which was disclosed in November 2011. In IEEE 802.11 ai, a beacon frame of another format may be additionally used, and such beacon frame may be referred to as a fast initial link setup (FILS) beacon frame. Additionally, a measurement pilot frame may be used in the scanning procedure as a frame including only a portion of the information of the beacon frame. The measurement pilot frame is disclosed in the IEEE 802.11 8.5.8.3 measurement pilot format.

Additionally, a FILS discovery frame may also be defined. As a frame being transmitted from each AP in-between the transmission cycle periods of the beacon frame, the FILS discovery frame may correspond to a frame that is transmitted while having a cycle period that is shorter than the beacon frame. More specifically, the FILS discovery frame corresponds to a frame that is being transmitted while having a transmission cycle period that is shorter than the beacon frame. The FILS discovery frame may include identifier information (SSID, BSSID) of the AP transmitting the discovery frame. The FILS discovery frame may be transmitted before the beacon frame is transmitted to the STA, so as to allow the STA to discover in advance that an AP exists within the corresponding channel. An interval at which the FILS discovery frame is transmitted is referred to as a FILS discovery frame transmission interval. The FILS discovery frame may be transmitted while including a portion of the information included in the beacon frame.

Referring to the right side of FIG. 2, in active scanning 250, a non-AP STA 290 may transmit a probe request frame 270 to an AP 260, thereby being capable of actively performing a scanning procedure.

After receiving the probe request frame 270 from the non-AP STA 290, the AP 260 waits for a random period of time in order to prevent frame collision. And, then, the AP 260 may include network information to a probe response frame 280 and may transmit the probe response frame 280 to the non-AP STA 290. The non-AP STA 290 may obtain the network information based on the received probe response frame 280 and may then stop the scanning procedure.

In case of active scanning 250, since the non-AP STA 290 actively performs scanning, it is advantageous in that the time consumed for performing the scanning procedure is short. However, since the non-AP STA 290 is required to transmit the probe request frame 270, it is disadvantageous in that the network overhead increases for the transmission and reception of the frames. The probe request frame 270 is disclosed in IEEE 802.11 8.3.3.9, and the probe response frame 280 is disclosed in IEEE 802.11 8.3.3.10.

Once the scanning is completed, the AP and the non-AP STA may perform the authentication and association procedures.

Figure 3:
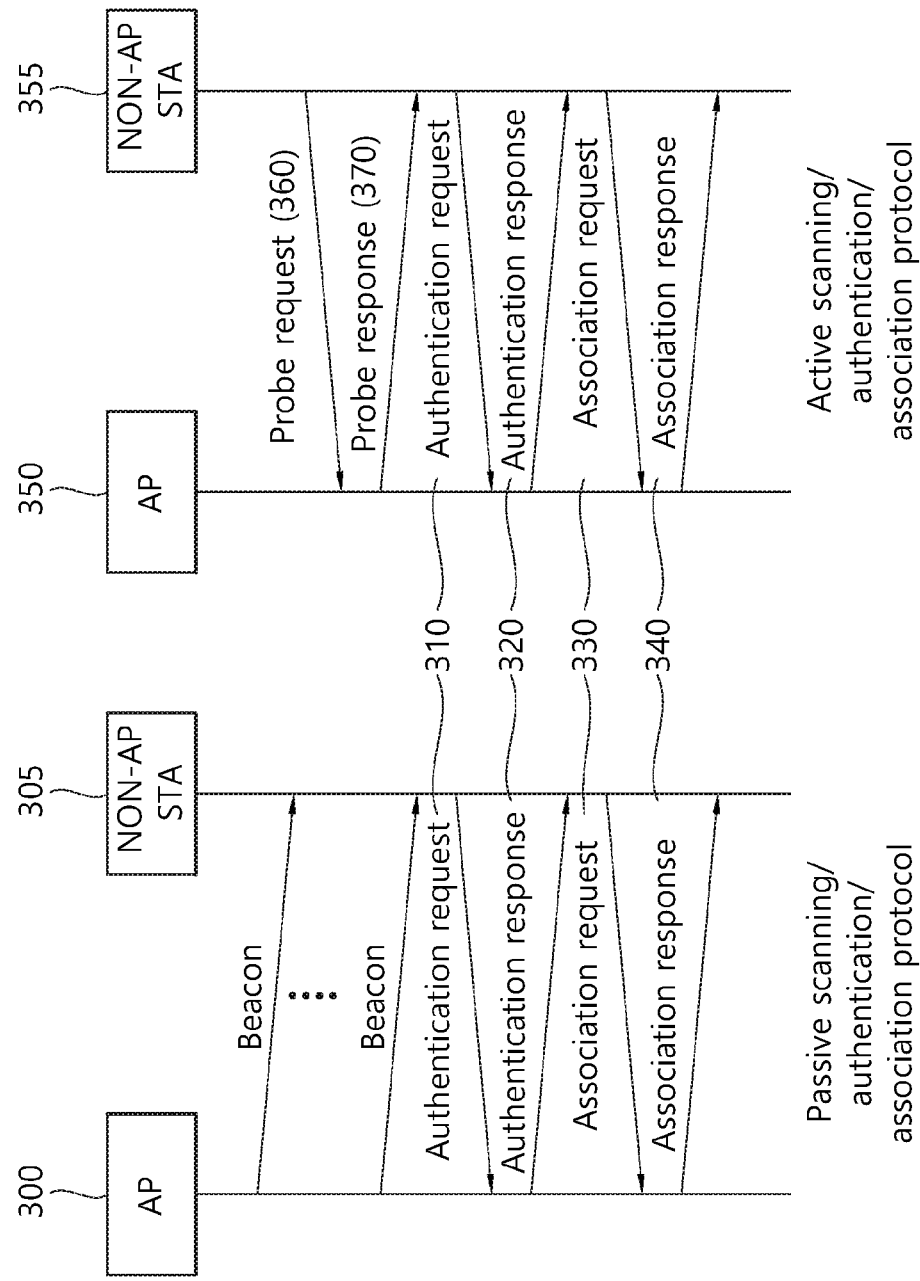
FIG. 3 is a conceptual diagram showing an authentication procedure and association procedure performed after the scanning procedure of an AP and an STA.

FIG. 3 is a conceptual view showing an authentication Procedure and an authentication procedure that are performed after a scanning procedure of an AP and a STA.

Referring to FIG. 3, after performing the passive/active scanning procedure, the authentication procedure and the association procedure may be performed with one of the scanned APs.

The authentication and association procedures may be performed, for example, through 2-way handshaking. The left side of FIG. 3 is a conceptual view showing the authentication and association procedures after performing passive scanning, and the right side of FIG. 3 is a conceptual view showing the authentication and association procedures after performing scanning.

Regardless of whether the active scanning method or the passive scanning method has been used, the authentication procedure and the association procedure may be equally performed by exchanging an authentication request frame 310/authentication response frame 320 and an association request frame 330/association response frame 340 between the AP 300 and 350 and the non-AP STA 305 and 355.

During the authentication procedure, the non-AP STA 305 and 355 may transmit an authentication request frame 310 to the AP 300 and 350. As a response to the authentication request frame 310, the AP 300 and 350 may transmit an authentication response frame 320 to the non-AP STA 305 and 355. Detailed description on the authentication frame format is disclosed in IEEE 802.11 8.3.3.11.

During the association procedure, the non-AP STA 305 and 355 may transmit an association request frame 330 to the AP 300 and 350. And, as a response to the association request frame 330, the AP 300 and 350 may transmit an association response frame 340 to the non-AP STA 305 and 355. Information related to the ability of the non-AP STA 305 and 355 is included in the association request frame 330, which is transmitted to the AP. Based on the capability information of the non-AP STA 305 and 355, the AP 300 and 350 may determine whether or not the non-AP STA 305 and 355 can be supported. In case the non-AP STA 305 and 355 can be supported, the AP 300 and 350 may transmit the association response frame 340 to the non-AP STA 305 and 355. The association response frame 340 may include information on whether or not the association request frame 330 is accepted and the corresponding reason and capability information of the non-AP STA that can be supported by the corresponding AP. Detailed description on the association frame format is disclosed in IEEE 802.11 8.3.3.5/8.3.3.6.

After the association procedure is carried out between the AP and the non-AP STA, normal transmission and reception of data may be performed between the AP and the non-AP STA. In case the association procedure between the AP and the non-AP STA has failed, based on the reason why the association procedure has failed, the association procedure may be performed once again with the same AP, or a new association procedure may be performed with another AP.

In case the STA is associated with the AP, the STA may be allocated with an association ID (association identifier, AID) from the AP. The AID that is allocated to the STA may correspond to a unique value within one BSS, and the current AID value may correspond to any one of the values within the range of 1~2007. Since 14 bits are allocated for the AID, although a maximum of 16383 bits may be used for the AID value, values within the range of 2008~16383 are reserved.

In the IEEE 802.11 standard, in order to extend the life span of STAs of a wireless LAN, a power save mechanism (Power save Mode) is provided.

An STA, which operates based on the Power Save mode, may reduce its power consumption by operating while shifting to and from an awake state and a doze state, thereby extending the operation life span of the STA. An STA, which operates based on an Active mode, may maintain the awake state. Based on information on a transmission opportunity (TXOP), although the Active mode may include a TXOP Power Save mode, which shifts the STA to and from the awake state and the doze state, it will be assumed that the STA is maintained in the awake state for simplicity.

An STA being in the awake state may perform normal operations, such as transmission or reception of frames, channel scanning, and so on. Conversely, an STA being in the doze state does not perform any transmission or reception of frames and does not perform any channel scanning in order to reduce power consumption. An STA operating in the Power Save mode maintains the doze state in order to reduce power consumption, and, then, when required, the corresponding STA may perform a shift (or transition) to the awake modes so as to carry out communication with the AP.

As the duration time for maintaining the doze state of the STA becomes more extended, the power consumption of the STA may be required, and the life span of the STA may be extended. However, in the doze state, it is impossible for the STA to perform the transmission or reception of frames. if a pending uplink frame exists in the STA, the STA, which was operating in the Power Save mode, may shift from a doze state to an active state, or, if a pending uplink frame exists in the STA, the STA, which was operating in the Power Save mode, may shift from a Power Save mode to an Active mode, thereby being capable of transmitting an uplink frame to the AP. Conversely, in case a pending frame that is to be transmitted to the STA, which is being operated in the doze state, exists in the AP, the AP cannot transmit the pending frame to the STA before the shift of the STA to the Awake mode.

Therefore, the STA operating in the Power Save mode may occasionally shift from the doze state to the awake state and may receive information on whether or not any pending frame for the STA exists from the AP. Considering a shifting time of the STA operating in the Power Save mode to the awake state, the AP may transmit information on the presence of pending downlink data for the STA to the STA.

More specifically, in order to receive information on the presence or absence of a pending frame for the STA, the STA operating in the Power Save mode periodically shifts from the doze state to the awake state, thereby being capable of receiving the beacon frame. As a frame being used for the passive scanning of the STA, the beacon frame may include information on the capability of the AP. The AP may periodically (e.g., 100 msec) transmit a beacon frame to the STA.

Figure 4:
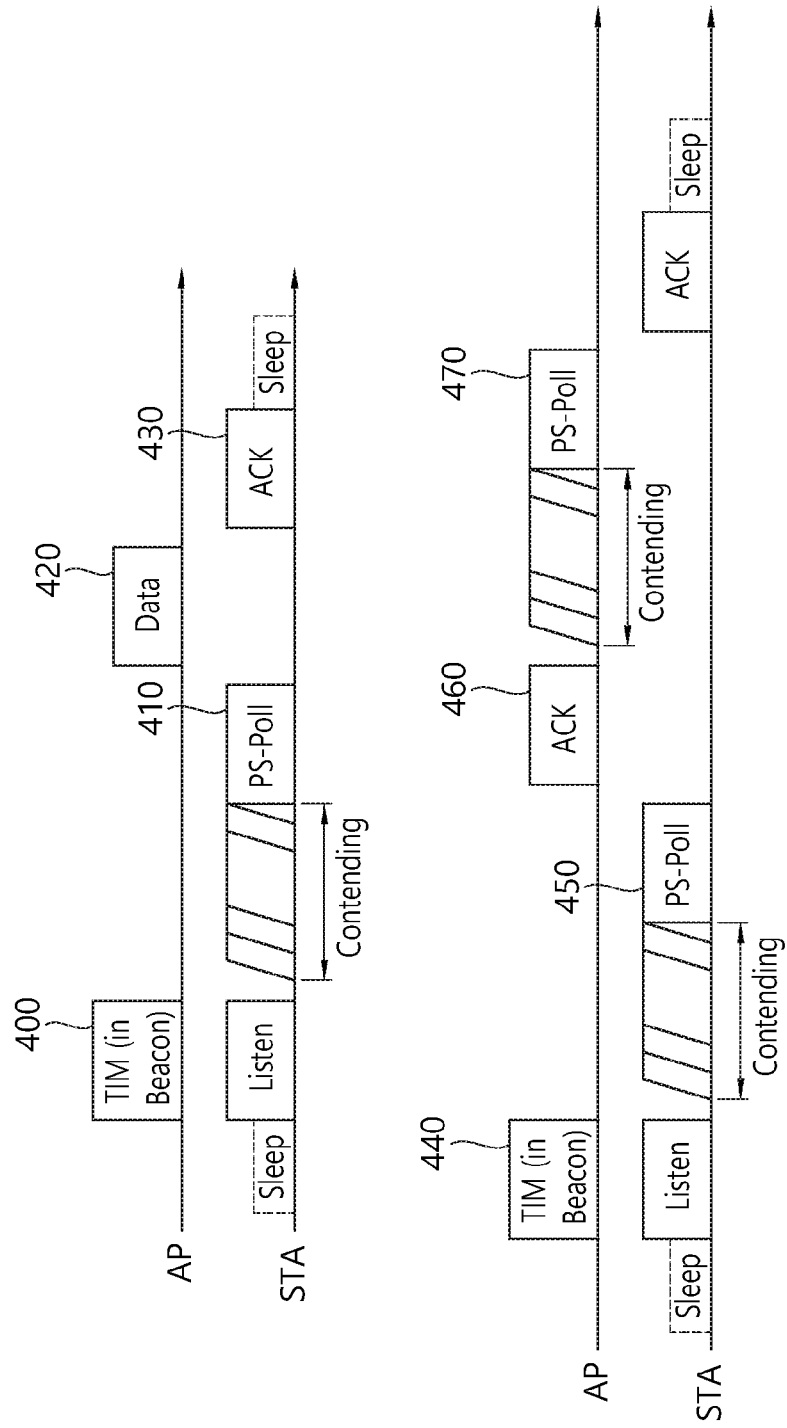
FIG. 4 is a conceptual diagram showing a power saving method based on a beacon frame.

FIG. 4 is a conceptual view showing a beacon frame based power saving method.

Referring to FIG. 4, the AP may periodically transmit a beacon frame, and, while considering the transmission timing of the beacon frame, the STA operating in the Power Save mode may periodically shift from the doze state to the awake state, thereby being capable of receiving the beacon frame. The beacon frame based Power Saving method may also be expressed by using the term TIM-based power save mode.

The beacon frame may include a traffic indication map (TIM) element. The TIM element may be used for transmitting the information on the pending downlink data for the STA to the AP. For example, the TIM element may include information on the pending downlink data for the STA based on a bitmap. The TIM element may be identified as a TIM or DTIM (delivery TIM). The TIM may indicate the presence of pending downlink data that are to be transmitted to the STA based on unicast. The DTIM may indicate the presence of pending downlink data that are to be transmitted based on broadcast/multicast.

The upper portion of FIG. 4 discloses a method of an AP for transmitting a downlink frame based on an immediate response to a power save (PS)-poll frame.

Referring to the upper portion of the FIG. 4, the STA may receive information on the presence of pending downlink data for the STA from the AP based on the TIM of the beacon frame 400. The STA may transmit a PS-poll frame 410 to the AP. The AP may receive the PS-poll frame 410 from the STA and may then transmit a downlink frame 420 to the STA as an immediate response to the received PS-poll frame 410. The immediate response to the PS-poll frame of the AP may be performed after a short interframe space (SIFS) after receiving the PS-poll frame.

The STA may transmit an ACK frame 430 as a response to the downlink frame. In case the transmission of the pending downlink data for the STA is ended, the STA operating in the Power Save mode may perform shifting (or transition) back to the doze state.

The lower portion of FIG. 4 discloses a method of an AP for transmitting a downlink frame based on a deferred response to a PS-poll frame.

Referring to the lower portion of the FIG. 4, the STA may receive information on the presence of pending downlink data for the STA from the AP based on the TIM of the beacon frame 440. The STA may transmit a PS-poll frame 450 to the AP. The AP may receive the PS-poll frame 450 from the STA and may then transmit an ACK frame 460 to the STA as a response to the received PS-poll frame 450. After the transmission of the ACK frame 460, the AP may transmit a downlink frame 470 including the pending downlink data to the STA. After receiving the ACK frame 460, the STA may monitor the downlink frame 470 being transmitted by the AP to the STA.

Similarly, in case the transmission of the pending downlink data for the STA is ended, the STA operating in the Power Save mode may perform shifting (or transition) from the awake state back to the doze state.

Figure 5:
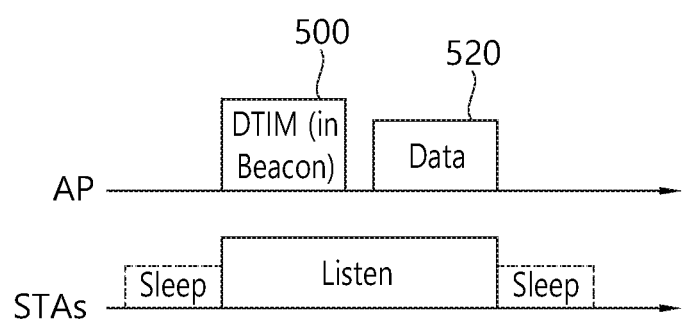
FIG. 5 is a conceptual diagram showing a power saving method based on a beacon frame.

FIG. 5 is a conceptual view showing a beacon frame based power saving method.

FIG. 5 discloses a case when a DTIM is delivered through a beacon frame 500. The beacon frame 500 may include a DTIM. As described above, the DTIM may indicate the presence of pending downlink data that are to be transmitted based on broadcast/multicast.

Referring to FIG. 5, the AP may transmit a beacon frame 500 including a DTIM to the STA. After receiving the beacon frame 500 including the DTIM, the STA may maintain the awake state without transmitting the PS-poll frame and may monitor the transmission of the downlink frame 520. The AP may transmit the downlink frame 520 to the STA by using the multicast method or the broadcast method.

Hereinafter, in the exemplary embodiment of the present invention, the transmission from the AP to the STA may also be expressed by using the term downlink transmission. Each of the PPDU, frame, and data being transmitted via downlink transmission may be respectively expressed by using the terms downlink PPDU, downlink frame, and downlink data. The PPDU may correspond to a data unit including a PPDU header, and a physical layer service data unit (PSDU) (or MAC protocol data unit (MPDU)). The PPDU header may include a PHY header and a PHY preamble, and the PSDU (or MPDU) may include a frame or may indicate a frame. The PHY header may also be expressed differently by using the term physical layer convergence protocol (PLCP)

header, and the PHY preamble may also be expressed differently by using the term PLCP preamble.

Additionally, the transmission from the STA to the AP may also be expressed by using the term uplink transmission. Each of the PPDU, frame, and data being transmitted via uplink transmission may be respectively expressed by using the terms uplink PPDU, uplink frame, and uplink data.

Figure 6:
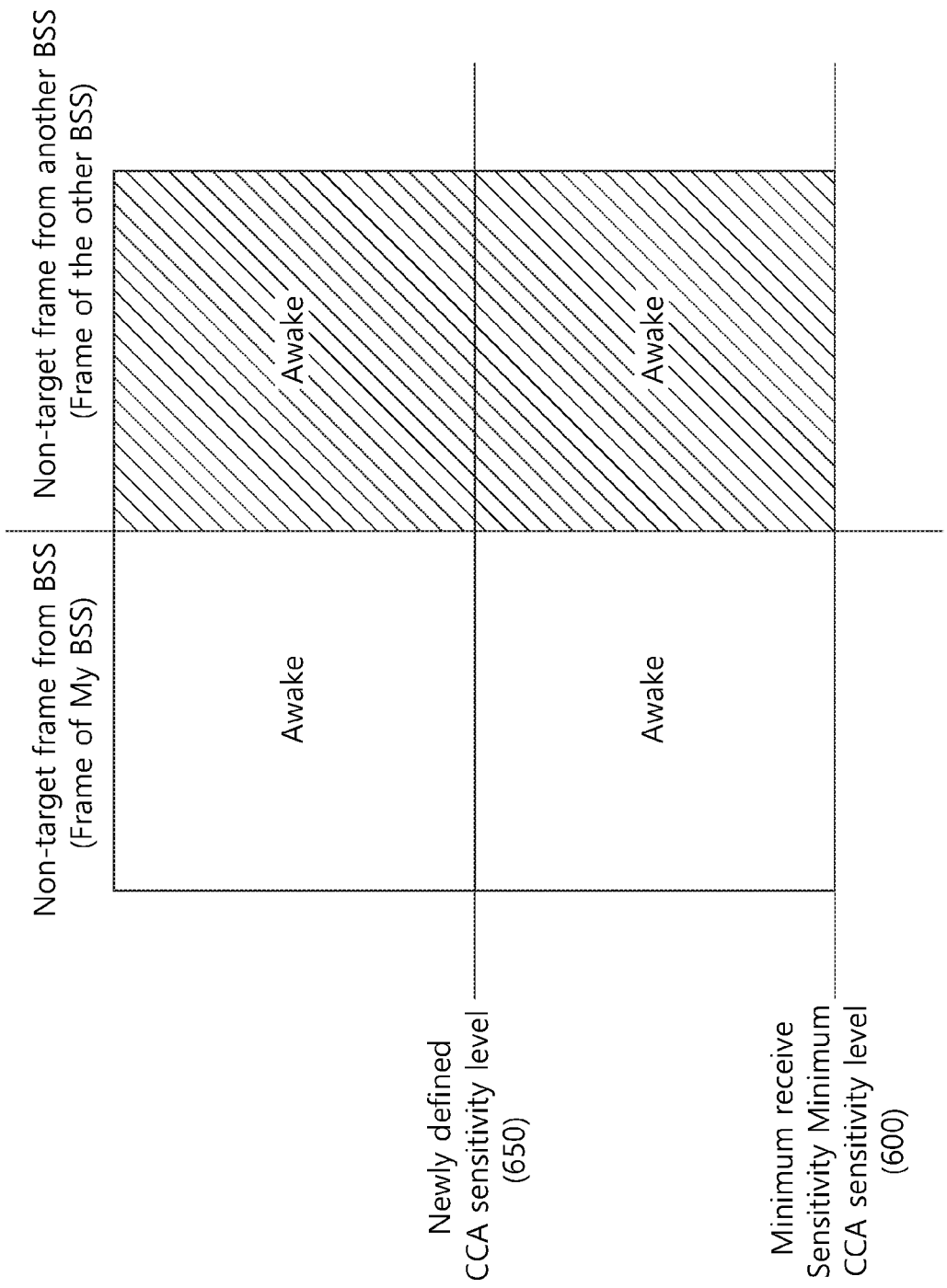
FIG. 6 is a conceptual diagram showing the operation state of an STA which performs a power save mode operation based on a TIM.

FIG. 6 is a conceptual diagram showing the operation state of an STA which performs a power save mode operation based on a TIM.

FIG. 6 discloses an operation mode of an STA operating in a power save mode based on a TIM when the STA receives a non-target frame (or an interference signal) from a BSS including the STA or another BSS. The non-target frame may be a format including other data other than downlink data transmitted to the STA by an AP.

In an existing WLAN system, an STA operating in a power save mode based on a TIM is set to maintain an active state regardless of a CCA sensitivity level of a received non-target frame when it receives an ACK frame for a transmitted PS-poll frame.

Referring to FIG. 6, in an existing WLAN system, when the STA receives a non-target frame from the BSS or another BSS, it continues to maintain an awake state regardless of the results of sensing based on an existing minimum CCA sensitivity level 600 and a newly defined CCA sensitivity level (e.g., −62 dBm) 650.

The AP may transmit downlink frame in response to a PS-poll frame through contention-based channel access. If the AP is capable of receiving the non-target frame transmitted by the BSS or another BSS during the channel access and determining (predicting) a determination of whether the channel state of the STA is busy or idle due to the non-target frame, the AP may be aware of the degree of interference with the STA attributable to the non-target frame.

For example, it may be assumed that a determination of a channel state by an AP based on a non-target frame and a determination of a channel state by an STA based on the non-target frame are the same. If the AP determines the channel state to be busy based on the non-target frame, it may determine (or predict) a result of the determination of the channel state based on the non-target frame by the STA to be busy. In contrast, if the AP determines the channel state to be idle based on the non-target frame, it may determine (or predict) a result of the determination of the channel state based on the non-target frame by the STA to be idle.

In accordance with an embodiment of the present invention, if an AP receives a non-target frame transmitted by a BSS or another BSS during channel access and is capable of being aware of a determination of whether a channel state is busy or idle based on the non-target frame by an STA, the AP may change an operation mode of the STA operating in a power save mode based on a TIM to the doze state in the time period in which severe interference attributable to the non-target frame is generated. In contrast, in the time period in which severe interference attributable to the non-target frame is not generated, the AP may maintain an operation mode of the STA operating in a power save mode based on a TIM to an idle state, and may transmit a downlink frame including pending downlink data with respect to the STA to the STA. Such a change of an STA operating in a power save mode based on a TIM to the doze state can reduce power consumption of the STA and a collision between frames.

In order for the AP to determine (predict) a result of the determination of whether the channel state is busy or idle based on the non-target frame by the STA, the STA and the AP may have a topology, such as that of FIG. 7 below. In the topology disclosed in FIG. 7, the AP may determine the degree of interference with the STA attributable to the non-target frame.

Figure 7:
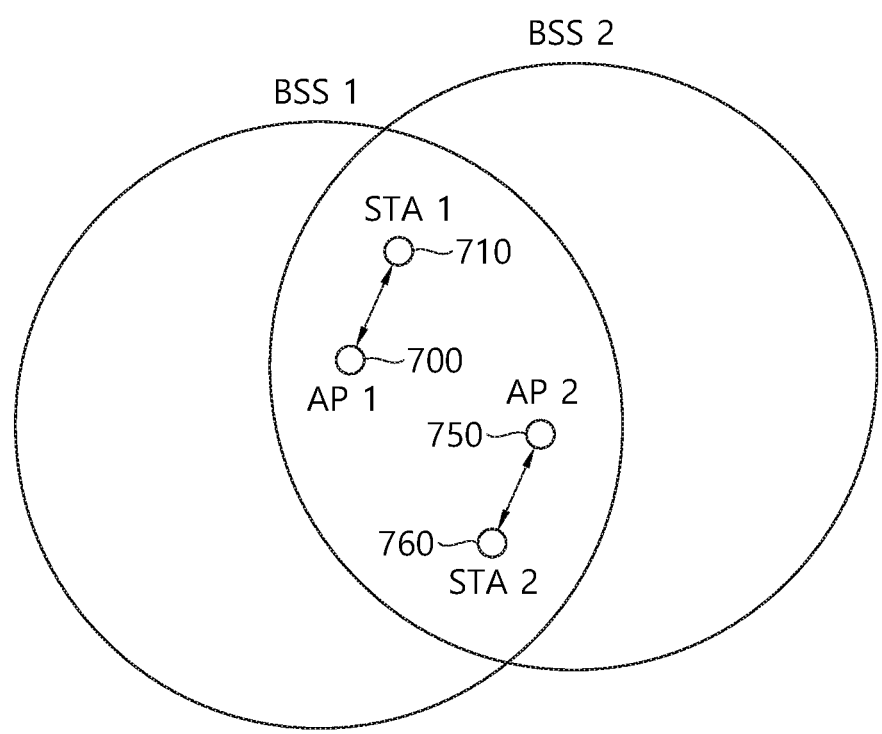
FIG. 7 is a topology for the prediction of a channel state between an STA and an AP according to an embodiment of the present invention.

The topology for predicting, by the AP, a result of the determination of whether the channel state is busy or idle based on the non-target frame by the STA, disclosed in FIG. 7, is only an example. Various topologies for predicting, by an AP, a result of a determination of whether a channel state is busy or idle based on a non-target frame by an STA other than FIG. 7 may be defined.

FIG. 7 is a topology for the prediction of a channel state between an STA and an AP according to an embodiment of the present invention.

FIG. 7 discloses a position relation between an STA and an AP for the prediction of a channel state between the STA and the AP according to an embodiment of the present invention.

Referring to FIG. 7, a BSS1 may include an AP1 700 and an STA1 710, and a BSS2 may include an AP2 750 and an STA2 760.

The STA1 710 may be associated with the AP1 700, and the STA2 760 may be associated with the AP2 750. If the distance between the STA1 710 and the AP1 700 is close, the STA1 710 and the AP1 700 may receive a non-target frame transmitted by the BSS2 (e.g., the STA2 760 and the AP2 750) in a reception signal level of a similar range. An STA may measure the intensity of a received signal in the PHY layer, may determine the state of a medium to be idle if the intensity of the received signal is smaller than a specific CCA sensitivity level, and may determine the state of the medium to be busy if the intensity of the received signal is greater than or equal to the CCA sensitivity level.

If the STA1 710 and the AP1 700 located at a contiguous distance listen to a non-target frame of a similar reception signal level transmitted by the BSS2, the STA1 710 and the AP1 700 may determine whether a medium is busy or idle identically based on the non-target frames transmitted by the BSS2. In this case, the STA1 710 may predict a result of the determination of whether the medium is busy or idle based on the non-target frame by the AP1 700. In contrast, the AP1 700 may also predict a result of the determination of whether the medium is busy or idle based on the non-target frame by the STA1 710 (or the degree of interference with the STA1 710 attributable to the non-target frame).

Each of an AP and/or an STA may previously determine whether each of the AP and the STA receives a non-target frame in the same or similar reception level.

For example, an AP and an STA may determine whether the reception levels of non-target frame of the AP and the STA are the same or similar based on the signal intensity of a frame transmitted and received between the AP and the STA.

For example, an STA may predict whether an AP and the STA receive non-target frames in reception signal levels of a similar range based on the transmission signal intensity and reception signal intensity of a frame (e.g., a beacon frame) received from the AP. From a viewpoint of the STA, the distance between the STA and the AP may be relatively close as a difference between the transmission signal intensity and reception signal intensity of the frame received from the AP. If a difference between the transmission signal intensity and reception signal intensity of the frame received from the AP is a specific threshold or less, the STA may predict that the AP receives a frame transmitted by another BSS in a reception signal level of a range similar to that of the STA and that the AP make the same determination as the STA regarding whether a medium is busy or idle. In contrast, from a viewpoint of the AP, the distance between the STA and the AP may be relatively close as a difference between the transmission signal intensity and reception signal intensity of the frame received from the STA.

An STA may periodically determine whether an AP and the STA make the same determination of whether a medium is busy or idle based on the reception intensity of a frame transmitted by the AP. In addition to the STA, the AP may also periodically determine whether the AP and the STA make the same determination of whether the medium is busy or idle based on the reception intensity of the frame transmitted by the STA, and may transmit a result of the periodical determination to the STA.

Furthermore, an AP may predict the distance between the AP and an STA based on a difference between the transmission signal intensity and reception signal intensity of a received frame. The AP may predict interference with the STA attributable to a non-target frame based on the predicted distance, and may determine (or predict) a determination of the channel of the STA based on the non-target frame.

In accordance with an embodiment of the present invention, if an AP is capable of determining (or predicting) a determination of the channel of an STA based on a non-target frame, it may set a value of a power management control bit to 1 when transmitting an ACK frame to be described later, and may perform the operation state setting of the STA based on a power management control frame.

In an embodiment of the present invention hereunder, it is assumed that an AP is capable of determining (or predicting) a determination of a channel based on a non-target frame by an STA.

Furthermore, an embodiment of the present invention hereunder discloses a method for determining, by an AP, the operation state of an STA when the AP receives a non-target frame during channel access for transmitting a downlink frame to the STA operating in a power save mode based on a TIM. More specifically, the present invention discloses a method for determining, by an AP, the operation state of an STA based on a non-target frame that belongs to non-target frames and that is transmitted by another BSS. The non-target frame transmitted by another BSS may be represented as a term called another BSS frame. A PPDU that carries another BSS frame may be represented as a term called another BSS PPDU.

Figure 8:
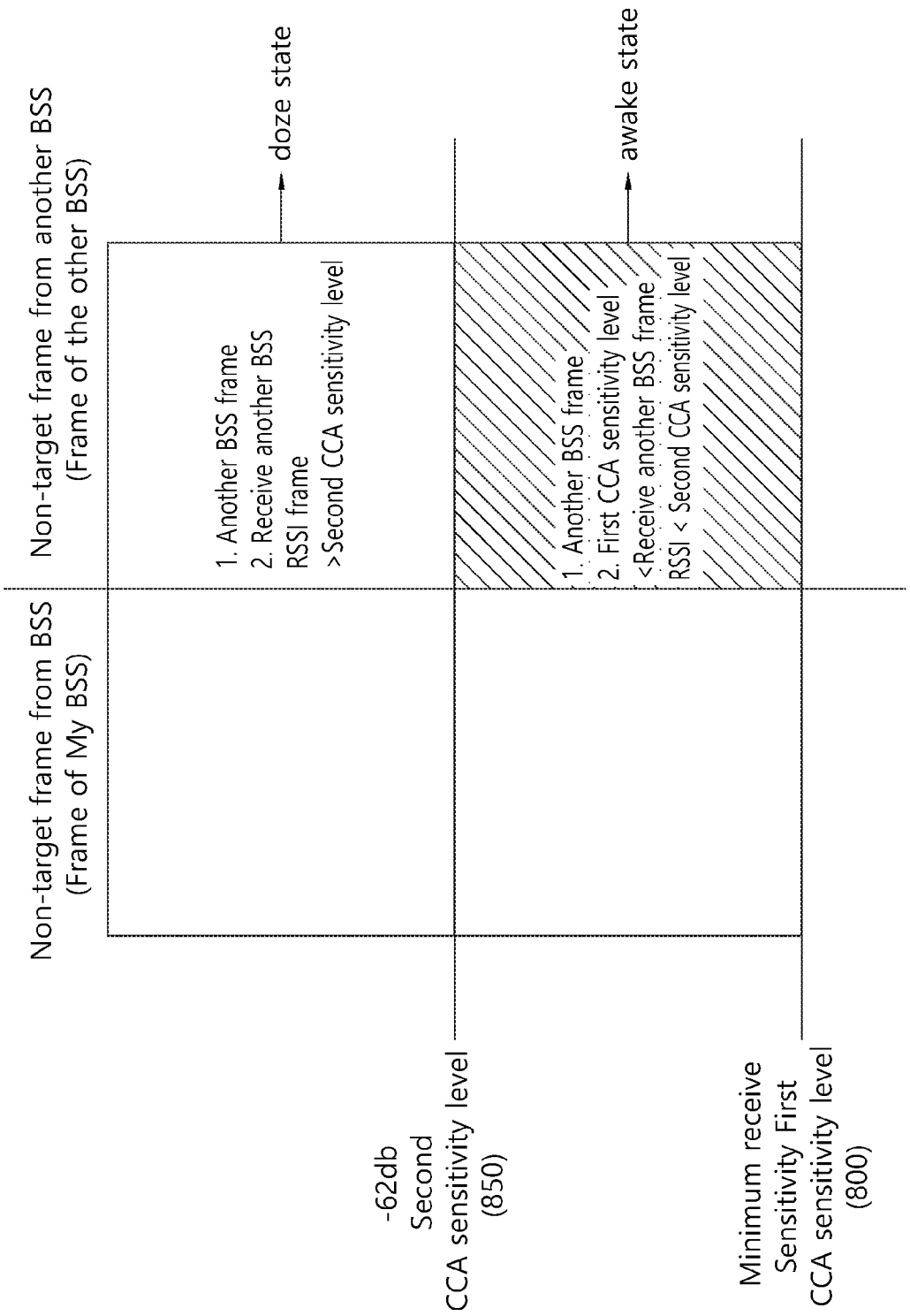
FIG. 8 is a conceptual diagram showing a method for setting, by an AP, the operating state of an STA operating in a power save mode based on a TIM according to an embodiment of the present invention.

FIG. 8 is a conceptual diagram showing a method for setting, by an AP, the operating state of an STA operating in a power save mode based on a TIM according to an embodiment of the present invention.

FIG. 8 discloses a method for determining the operation state of an STA operating in a power save mode based on a TIM based on the reception intensity of a non-target frame by an AP and a CCA sensitivity level.

Referring to FIG. 8, an AP may receive a PS-poll frame from an STA operating in a power save mode based on a TIM and may transmit an ACK frame to the STA in response to the PS-poll frame.

The ACK frame may include information about whether a method for determining the operation state of an STA is to be performed based on the reception intensity of another BSS frame. In other words, the ACK frame may include information about whether a method for determining the operation state of an STA is to be performed based on a power management control frame. The information about whether a method for determining the operation state of an STA is to be performed based on the reception intensity of another BSS frame (or information about whether a method for determining the operation state of an STA is to be performed based on the power management control frame) may be included in the power management control field of an ACK frame to be described later. If an AP is capable of determining (or predicting) a determination of a channel by an STA based on another BSS frame, the AP may transmit a power management control field, including information indicative of the execution of a method for determining the operation state of an STA based on the reception intensity of another BSS frame, through an ACK frame.

In order to transmit a downlink frame including pending downlink data with respect to an STA, an AP may perform contention-based channel access. The AP may sense (or receive) a frame (or PPDU) transmitted on a medium during channel access. The AP may determine whether a received frame is another BSS frame based on the received frame, a frame included in a PPDU that carries the frame, or information (e.g., a color bit or a PBSSID) about the ID of a BSS that has transferred a PPDU.

If a frame received during channel access is another BSS frame and the reception intensity of the frame is greater than a first CCA sensitivity level 800 and smaller than a second CCA sensitivity level 850, an AP may set the state of an STA operating in a power save mode based on a TIM as the awake state. For example, the AP may check that the received frame is another BSS frame based on color bit information about the received frame. If the intensity of a received another BSS is greater than the first CCA sensitivity level 800 and smaller than the second CCA sensitivity level 850, the AP may transmit a power management control frame, including information for maintaining the state of an STA to the awake state, to the STA. An inter-frame space between the power management control frame and another BSS frame may be a predetermined time period (e.g., a short inter-frame space (SIFS)). An operation for setting, by an AP, the awake state of an STA is described in detail later.

Alternatively, if the received frame is another BSS frame and the reception intensity of the frame is smaller than the second CCA sensitivity level 850, the AP may set the state of the STA so that the STA maintain the awake state.

The first CCA sensitivity level 800 is a minimum CCA sensitivity level and may be a value for checking whether a channel is busy or idle in an existing WLAN system. For example, the first CCA sensitivity level 800 may be −72 dBm based on a 20 MHz bandwidth. The second CCA sensitivity level 850 is a newly defined CCA sensitivity level according to an embodiment of the present invention, and may be a value for checking whether a channel is busy or idle in a WLAN system according to an embodiment of the present invention. The second CCA sensitivity level 850 may be defined as a value (e.g., −62 dBm) greater than the first CCA sensitivity level 800. If whether a channel is idle or not is determined based on the second CCA sensitivity level 850, the probability that the channel is determined to be idle may be higher than that the channel is determined to be idle based on the first CCA sensitivity level 800. That is, an STA operating by determining whether a channel is idle or not based on the second CCA sensitivity level 850 may have low sensitivity for a channel and obtain relatively many frame transmission opportunities. The second CCA sensitivity level 850 may be a separate value set to determine the operation state of an STA operating in a power save mode based on a TIM based on the reception intensity of another BSS frame of an AP. In an embodiment of the present invention hereunder, the second CCA sensitivity level 850 may be represented as another term called a power management CCA sensitivity level.

In contrast, if a received frame is another BSS frame and the reception intensity of the frame is greater than or equal to the power management CCA sensitivity level, an AP may set the state of an STA operating in a power save mode based on a TIM as the doze state. For example, in order to transmit a downlink frame including pending downlink data to the STA, the AP may check that the received frame is another BSS frame based on color bit information of the received frame. If the reception intensity of the received another BSS is greater than or equal to the power management CCA sensitivity level, the AP may transmit a power management control frame, including information for setting the state of the STA to the doze state, to the STA. An inter-frame space between the power management control frame and another BSS frame may be a predetermined interval (e.g., an SIFS). An operation for setting, by an AP, the doze state of an STA is described in detail later.

Figure 9:
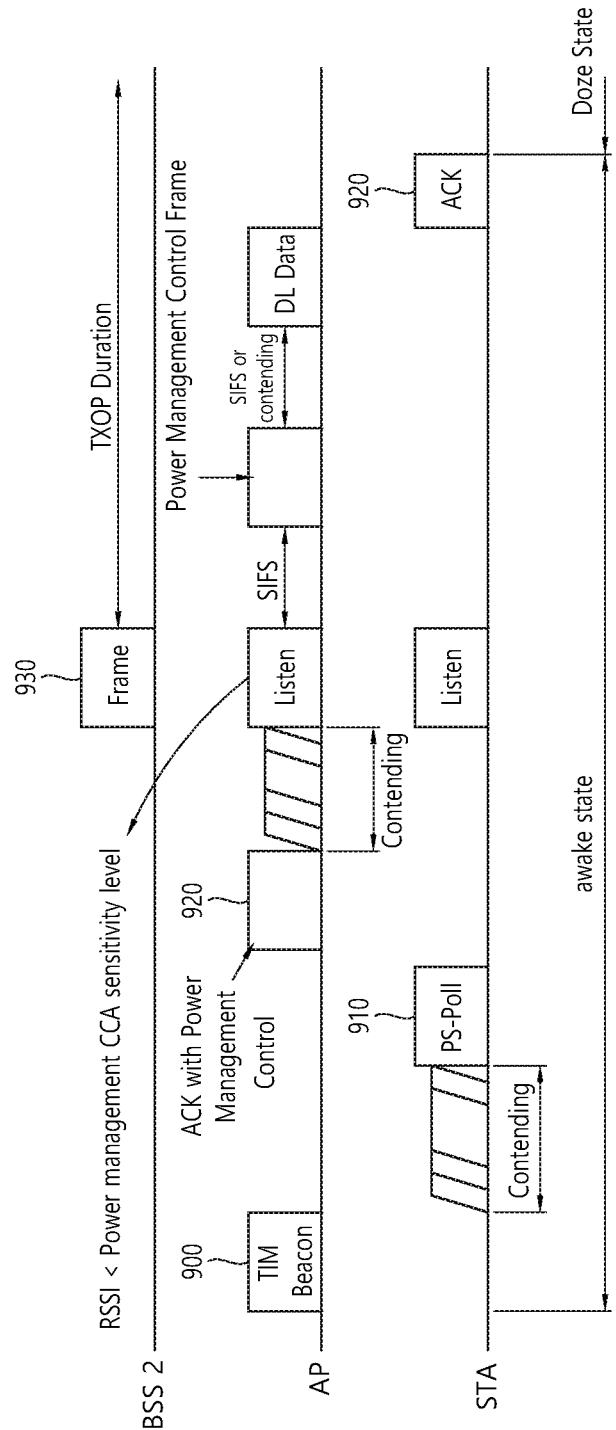
FIG. 9 is a conceptual diagram showing a method for setting, by an AP, the operating state of an STA operating in a power save mode based on a TIM according to an embodiment of the present invention.

FIG. 9 is a conceptual diagram showing a method for setting, by an AP, the operating state of an STA operating in a power save mode based on a TIM according to an embodiment of the present invention.

FIG. 9 discloses a method for controlling, by an AP, the operating state of an STA when the AP receives another BSS frame during channel access for the transmission of a downlink frame, including pending downlink data, to the STA operating in a power save mode based on a TIM. More specifically, FIG. 9 discloses a method for setting, by an AP, the operation state of an STA when the reception intensity of another BSS frame is smaller than the power management CCA sensitivity level.

Referring to FIG. 9, an STA operating in a power save mode based on a TIM may switch from the doze state to the awake state in order to receive a beacon frame 900 based on a listening interval.

The STA may receive the beacon frame 900, including a TIM indicative of pending downlink data with respect to the STA, from an AP. The STA may receive the beacon frame 900 including the TIM indicative of the downlink data, and may transmit a PS-poll frame 910 to the AP by performing contention-based channel access.

The AP that has received the PS-poll frame 910 may transmit an ACK frame 920 to the STA in response to the PS-poll frame 910. The ACK frame 920 may include a power management control field. For example, if a value of the power management control field included in the ACK frame 920 is 1, after transmitting the ACK frame 920, the AP may indicate that the operation state of the STA may be set based on the reception intensity of another BSS frame 930 received during channel access.

After transmitting the ACK frame 920, the AP may transmit a power management control frame 940 in order to set the operation state of the STA based on the reception intensity of another BSS frame 930 received during channel access. The power management control frame 940 transmitted by the AP may be used to set the doze state or awake state of an STA operating in a power save mode based on a TIM. Whether or not to set the operation state of an STA may be indicated based on the reception intensity of another BSS frame according to an embodiment of the present invention based on a value of the power management control field of the ACK frame 920.

The STA may determine whether it will perform a power management operation based on the power management control frame 940 through the power management control field included in the ACK frame 920. For example, if a value of the power management control field of the received ACK frame 920 is 1, the STA may determine whether it will switch to the doze state or maintain the awake state by monitoring whether the power management control frame 940 has been transmitted or not after receiving the ACK frame 920.

In FIG. 9, it is assumed that the power management control field of the ACK frame 920 is 1.

The AP may transmit the ACK frame 920 and perform contention-based channel access in order to transmit a downlink frame, including pending downlink data with respect to the STA, to the STA.

More specifically, the AP may determine whether a medium is busy or idle and perform contention-based channel access for transmitting the downlink frame to the STA. For example, if the medium is not used for a specific interval (e.g., a distributed coordination function (DCF) inter-frame space (DIFS)) or more (i.e., if the medium is idle), the AP may transmit the downlink frame. In contrast, if the medium is determined to being used by a carrier sensing mechanism, the AP may determine the size of a contention window (CW) by a random backoff algorithm and perform a backoff procedure. Whether the medium is being used may be determined based on a CCA sensitivity level (e.g., the first CCA sensitivity level or the second CCA sensitivity level). For the backoff procedure, the AP may select a random variable within the CW. The backoff time of the AP may be determined when the AP selects the random variable. The AP may perform channel access for the transmission of the downlink frame based on the backoff time.

Before the AP transmits a downlink frame 950 after succeeding in the channel access, the AP may receive another BSS frame 930. For example, if another STA (or another AP) included in another BSS overlapping a BSS including the AP occupies a medium prior to the AP, the AP may receive another BSS frame 930 transmitted by another STA or another AP. If the AP and the STA are located at contiguous positions as in the topology disclosed in FIG. 7, the STA included in the same BSS as the AP may receive another BSS frame 930.

In accordance with an embodiment of the present invention, a PPDU that carries a frame may include BSS ID information (e.g., a color bit and a partial basic service set identifier (PBSSID)) indicative of a BSS that has transmitted the PPDU. In other words, the PHY header (or PLCP header) of the frame may include the BSS ID information (a color bit and a PBSSID) indicative of the BSS that has transmitted the frame. For example, the color bit is ID information of the BSS of an X bit (e.g., X=3) and may be used to identify the BSS. The BBS color bit may be set by the AP. The AP may transmit information about the set BBS color bit to the STA. The BBS color bit is one of integer values of 0~7. The BBS color bit set by the AP may be maintained while the BSS is present.

A PBSSID is information about the ID of a BSS of a Y bit (e.g., Y=9) and may be used to identify the BSS. The PBSSID may be used to identify the BSS based on some of bits that form a BSSID for identifying the BSS. A BSSID is a 48-bit MAC address and may be unique ID information about a BSS. For example, a PBSSID may be the least significant bit (LSB) of 9 bits of a BSSID.

That is, the header of a PPDU that carries a frame may include the ID information of a BSS that has transmitted the frame (or PPDU). An AP may be aware that a received frame is another BSS frame based on the BSS ID information included in a received PPDU. When the AP receives another BSS frame during channel access, it may determine whether or not to transmit a power management control frame by comparing the reception intensity of another BSS frame with the power management CCA sensitivity level (or a power management CCA level or a power management CCA threshold). The reception intensity of another BSS frame may be the received signal strength indicator (RSSI) of the PLCP header of a PPDU that carries another BSS frame.

FIG. 9 discloses a case where the reception intensity of another BSS frame 930 receives by the AP is smaller than the power management CCA sensitivity level. If the reception intensity of another BSS frame 930 received by the AP is smaller than the power management CCA sensitivity level, the AP may determine that interference on a medium attributable to another BSS frame 930 is not great. If the topology between the AP and the STA is the same as that of FIG. 7 as described above, the AP may determine that the reception intensity of another BSS frame 930 of the STA is smaller than the power management CCA sensitivity level. Accordingly, the AP may determine that interference on the STA attributable to another BSS frame 930 is small and transmit the power management control frame 940 to the STA in order to maintain the awake state of the STA.

The power management control frame 940 transmitted by the AP may include a state setting field for indicating the setting of the awake state or doze state of the STA. For example, if the state setting field of the power management control frame 940 is 0, it may indicate that the STA should switch to the doze state. In contrast, if the state setting field of the power management control frame 940 is 1, it may indicate that the STA should maintain the awake state. Alternatively, the power management control frame 940 may include only information for indicating that the STA should maintains the awake state. The AP may induce the STA to switch from the awake state to the doze state by not transmitting the power management control frame 940 after receiving another BSS frame.

After receiving another BSS frame 930, the STA may monitor the transmission of the power management control frame 940 transmitted by the AP. The STA may determine whether to switch to the doze state or to maintain the awake state based on the state setting field of the power management control frame 940 transmitted by the AP. Alternatively, the STA may determine whether to switch to the doze state or to maintain the awake state based on whether the power management control frame 940 has been transmitted by the AP or not.

If the reception intensity of another BSS frame 930 received by the AP is smaller than the power management CCA sensitivity level, the AP may transmit the power management control frame 940 for maintaining the awake state of the STA.

The STA may receive the power management control frame 940 for maintaining the awake state from the AP and maintain the awake state.

The AP may transmit the power management control frame 940 to the STA, may perform contention-based channel access, and may transmit the downlink frame 950 to the STA. Alternatively, the AP may transmit the power management control frame 940 to the STA, and may transmit the downlink frame 950 to the STA after a specific time (e.g., an SIFS). The STA may transmit the ACK frame 960 to the AP in response to the downlink frame 950.

The STA that has received the power management control frame 940 may maintain the awake state and monitor the downlink frame 950 to be transmitted by the AP. The STA may receive the downlink frame 950 from the AP and transmit the ACK frame 960 to the AP in response to the downlink frame 950.

Figure 10:
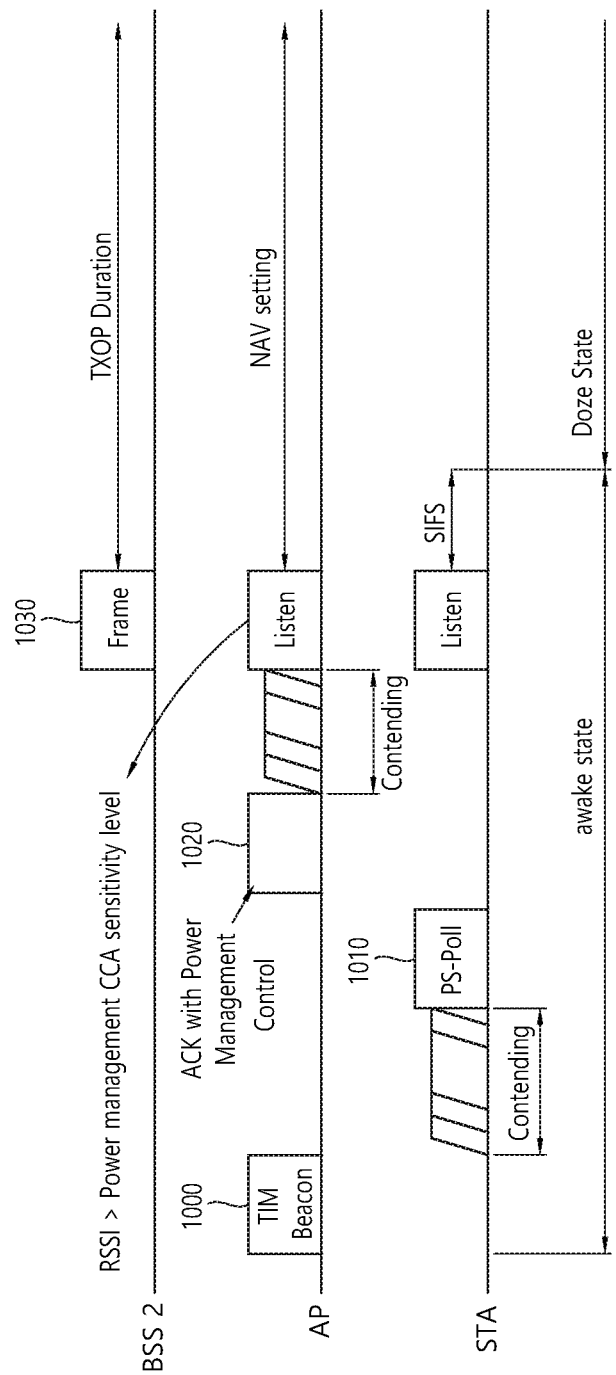
FIG. 10 is a conceptual diagram showing a method for controlling, by an AP, the operating state of an STA operating in a power save mode based on a TIM according to an embodiment of the present invention.

FIG. 10 is a conceptual diagram showing a method for controlling, by an AP, the operating state of an STA operating in a power save mode based on a TIM according to an embodiment of the present invention.

FIG. 10 discloses a method for controlling, by an AP, the operating state of an STA when the AP receives another BSS frame during channel access for the transmission of a downlink frame including pending downlink data to the STA operating in a power save mode based on a TIM. More specifically, FIG. 10 discloses a method for setting, by an AP, the operation state of an STA if the reception intensity of another BSS frame is greater than or equal to the power management CCA sensitivity level.

Referring to FIG. 10, an STA operating in a power save mode based on a TIM may switch from the doze state to the awake state in order to receive a beacon frame 1000 based on a listening interval.

The STA may receive the beacon frame 1000, including a TIM indicative of pending downlink data with respect to the STA, from an AP. The STA may receive the beacon frame 1000 including a TIM indicative of downlink data and transmit a PS-poll frame 1010 to the AP by performing contention-based channel access.

The AP that has received the PS-poll frame 1010 may transmit an ACK frame 1020 to the STA in response to the PS-poll frame 1010. The ACK frame 1020 may include a power management control field. A value of the power management control field included in the ACK frame 1020 may indicate that a power management control frame may be transmitted based on the reception intensity of another BSS frame received during channel access after the AP transmits the ACK frame 1020. The STA may determine to perform a power management operation based on the power management control frame through the power management control field included in the ACK frame, and may monitor the power management control frame.

The AP may transmit the ACK frame 1020 and perform contention-based channel access in order to transmit a downlink frame, including pending downlink data with respect to the STA, to the STA. Before the AP transmits the downlink frame to the STA after succeeding in the channel access, the AP may receive another BSS frame 1030. The header of the PPDU that carries the frame may include the ID information of a BSS that has transmitted the frame (or PPDU). The AP may be aware that the received frame is another BSS frame 1030 based on the BSS ID information include in the received PPDU.

FIG. 10 discloses a case where the reception intensity of another BSS frame 1030 received by the AP is greater than or equal to a power management CCA sensitivity level. If the reception intensity of another BSS frame 1030 received by the AP is greater than or equal to the power management CCA sensitivity level, the AP may determine that interference on a medium attributable to the reception of another BSS frame 1030 will be great. If a topology between the AP and the STA is the same as that of FIG. 7, the AP may determine that the reception intensity of another BSS frame 1030 of the STA is also greater than or equal to the power management CCA sensitivity level. Accordingly, the AP may change the STA to the doze state by not transmitting a separate power management control frame. Alternatively, the AP may transmit the power management control frame, including a state setting field indicative of switch to the doze state, to the STA so that the STA can switch to the doze state.

An embodiment of the present invention discloses a method for changing, by an AP, an STA to the doze state by not transmitting a separate power management control frame to the STA.

After receiving another BSS frame 1030, the STA may monitor the transmission of a power management control frame transmitted by the AP. If a power management control frame is not received from the AP for a specific time (e.g., an SIFS) after receiving another BSS frame 1030, the STA may determine to switch to the doze state. For example, if a topology between the AP and the STA is the same as that of FIG. 7, the STA and the AP may receive another BSS frame 1030. If the STA receives another BSS frame 1030 and does not receive a power management control frame for a specific time (e.g., an SIFS), the STA may determine to switch to the doze state. The STA and the AP may set an NAV based on another BSS frame 1030 (or a PPDU that carries another BSS frame). The NAV may be the indicator of a time period in which the transmission of a frame by the STA is not performed on a radio medium.

The AP and the STA may be aware of transmission opportunity (TXOP) duration for the transmission of another BSS frame 1030 based on information about the length of an L-SIG field included in the PHY header of a PPDU that carries another BSS frame 1030. The AP and the STA may set an NAV value based on the TXOP duration of the PPDU that carries another BSS frame 1030. The STA may switch to the doze state during the TXOP duration (or a set NAV timer) for the transmission of another BSS frame 1030.

Alternatively, the AP and the STA may be aware of the TXOP duration for the transmission of another BSS frame based on a duration field included in the MAC header of another BSS frame. The AP and the STA may set an NAV value based on TXOP duration of a PPDU that carries another BSS frame. The STA may switch to the doze state during the TXOP duration for the transmission of another BSS frame.

That is, if interference attributable to another BSS is great, the AP may change the STA operating in a power save mode based on a TIM to the doze state in a time period in which interference attributable to another BSS is great, thereby avoiding a collision between a downlink frame and another BSS frame and reducing power of the STA.

Figure 11:
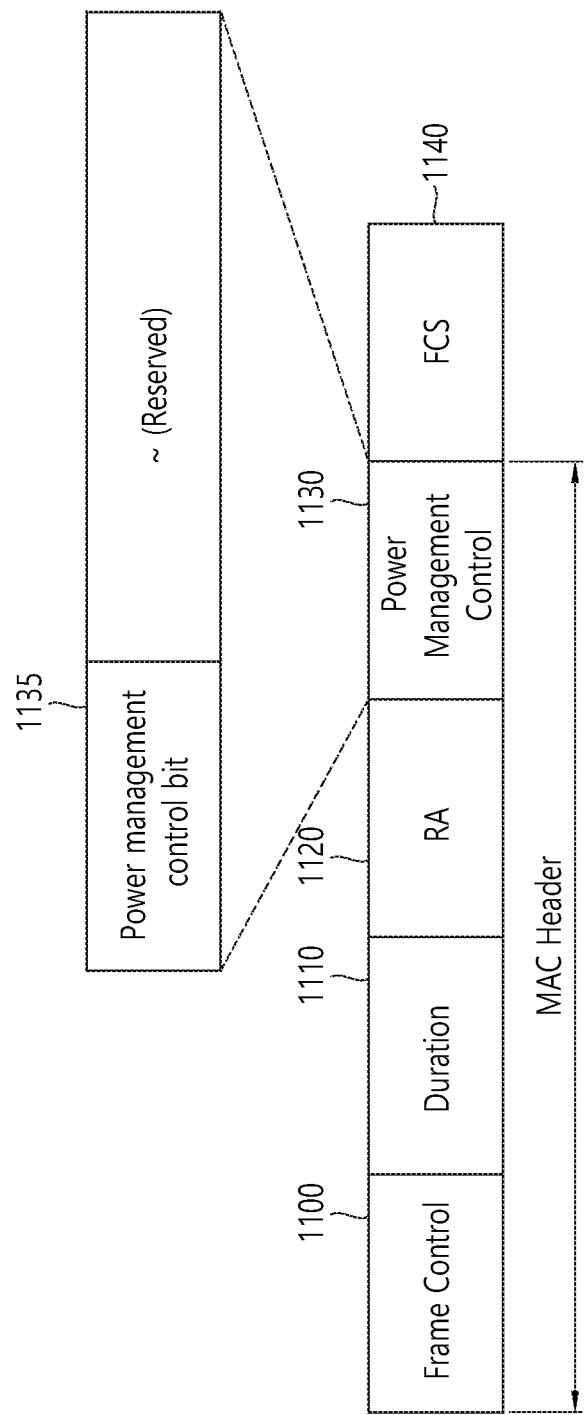
FIG. 11 is a conceptual diagram showing an ACK frame according to an embodiment of the present invention.

FIG. 11 is a conceptual diagram showing an ACK frame according to an embodiment of the present invention.

FIG. 11 discloses an ACK frame including a power management control field 1130.

Referring to FIG. 11, the MAC header of the ACK frame may include a frame control field 1100, a duration field 1110, a receiver address (RA) field 1120, and the power management control field 1130.

The frame control field 1100 may include information for indicating the type of frame.

The duration field 1110 may include information about duration for a procedure for transmitting and receiving a frame based on the ACK frame.

The RA field 1120 may include information about a receiving stage that receives the ACK frame.

The power management control field 1130 may include information for the power management of an STA. The power management control field 1130 may include information about whether or not to set an operation mode of an STA operating in a power save mode based on a TIM based on the reception intensity of another BSS frame by an AP. In other words, the power management control field 1130 may include information about whether or not to perform a power management operation based on the power management control frame. For example, the power management control field 1130 may correspond to 8 bits, and one of the 8 bits may be used as a power management control bit 1135. The power management control bit 1135 may include information about whether or not to perform a power management operation by an AP with respect to an STA based on the power management control frame. If a value of the power management control bit 1135 of the received ACK frame is 1, the STA may monitor the transmission of the power management control frame by an AP after receiving the ACK frame, and may determine whether to switch to the doze state or to maintain the awake state.

If the AP is to transmit the ACK frame in which a value of the power management control bit 1135 is 1 to the STA, the AP may transmit the power management control frame to the STA in after specific time since it receives another BSS frame in order to maintain the awake state of the STA. In contrast, if the AP transmits the ACK frame in which a value of the power management control bit 1135 is 1 to the STA, the AP may not transmit a power management control frame after receiving another BSS frame so that the STA switches to the doze state.

A frame check sequence (FCS) 1140 may be used to check an error generated in the frame.

Figure 12:
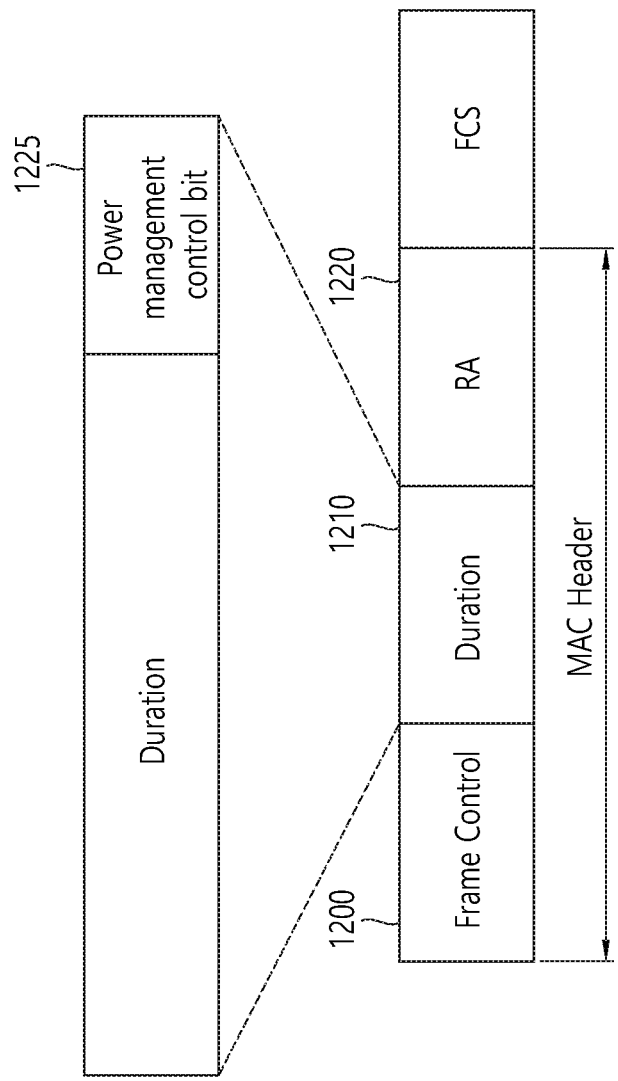
FIG. 12 is a conceptual diagram showing an ACK frame according to an embodiment of the present invention.

FIG. 12 is a conceptual diagram showing an ACK frame according to an embodiment of the present invention.

FIG. 12 discloses an ACK frame including a power management control field. More specifically, there is disclosed a case where a power management control bit is included in a duration field.

Referring to FIG. 12, the MAC header of the ACK frame may include a frame control field 1200, a duration field 1210, and a receiver address (RA) field 1220.

The frame control field 1200 may include information for indicating the type of frame.

The duration field 1210 may include information about duration for a procedure for transmitting and receiving a frame based on the ACK frame. In accordance with an embodiment of the present invention, the duration field 1210 may further include a power management control bit. The power management control bit, as described above, may be used to determine whether or not to perform a power management operation based on a power management control frame. If a value of the power management control bit 1225 is 1, it may indicate that a power management operation based on a power management control frame is performed by an AP. If a value of the power management control bit 1225 of a received ACK frame is 1, an STA may determine whether to switch to the doze state or to maintain the awake state by monitoring the transmission of a power management control frame after receiving the ACK frame.

The RA field 1220 may include information about a receiving stage that receives the ACK frame.

An FCS may be used to check an error generated in the frame.

Figure 13:
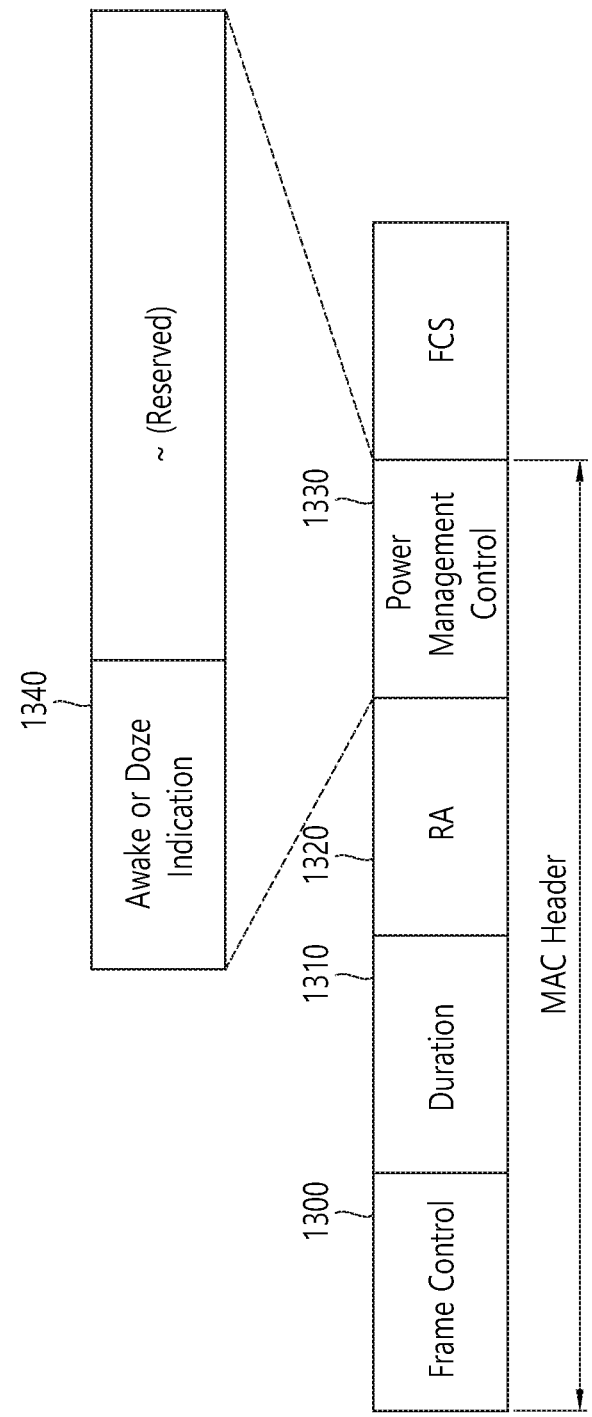
FIG. 13 is a conceptual diagram showing a power management control frame according to an embodiment of the present invention.

FIG. 13 is a conceptual diagram showing a power management control frame according to an embodiment of the present invention.

Referring to FIG. 13, the power management control frame may include a frame control field 1300, a basic service set identifier (BSSID) (a transmitter identifier (TA)) field 1310, an RA field 1320, and a power management control field 1330 in an MAC header.

The frame control field 1330 may include information indicating the type of frame.

The BSSID (TA) field 1310 may include information about the ID of an AP that has transmitted the power management control frame. The BSSID (TA) field 1310 may include ID information about a BSS including an AP.

The RA field 1320 may include ID information about a receiving stage (e.g., an STA) that will receive the power management control frame.

The power management control field 1330 may include information for controlling the operation state of an STA. For example, the power management control field 1330 may include 8 bits, and one of the 8 bits may be used to set the maintenance of the awake state of an STA. Alternatively, 1 bit 1340 of the 8 bits may be used to maintain the awake state of an STA or may be used as an awake or doze indicator for setting switch to the doze state. The 7 bits of the 8 bits may be reserved bits.

An FCS may be used to check an error generated in the frame.

Figure 14:
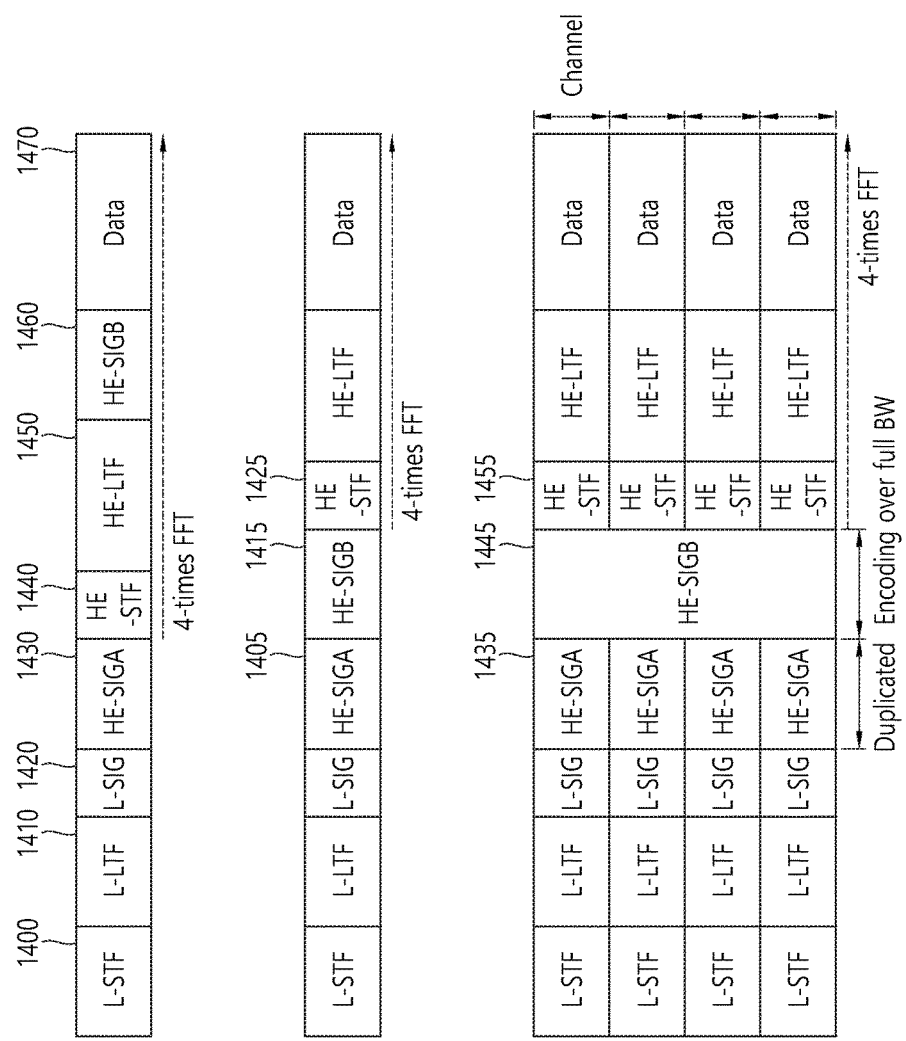
FIG. 14 is a conceptual diagram showing a PPDU format for delivering a frame according to an embodiment of the present invention.

FIG. 14 is a conceptual diagram showing a PPDU format for delivering a frame according to an embodiment of the present invention.

FIG. 14 discloses a PPDU format according to an embodiment of the present invention. A PPDU may include a PPDU header and an MAC protocol data unit (MPDU) (or a physical layer service data unit (PSDU)). A frame may correspond to the MPDU. The PPDU header of the PPDU format may be used as a meaning including the PHY header of a PPDU and a PHY preamble.

The PPDU format disclosed in FIG. 14 may be used to carry the aforementioned frame (e.g., the ACK frame, the downlink frame including pending downlink data, or the power management control frame).

Referring to the top of FIG. 14, the PPDU header of a downlink PPDU may include a legacy-short training field (L-STF), a legacy-long training field (L-LTF), a legacy-signal (L-SIG), a high efficiency-signal (HE-SIG) A, a high efficiency-short training field (HE-STF), a high efficiency-long training field (HE-LTF), and a high efficiency-signal-B (HE-SIG B). The PPDU may be divided into a legacy part from the PHY header to the L-SIG and a high efficiency (HE) part after the L-SIG.

The L-STF 1400 may include a short training orthogonal frequency division multiplexing (OFDM) symbol. The L-STF 1400 may be used for frame detection, automatic gain control (AGC), diversity detection, and coarse frequency/time synchronization.

The L-LTF 1410 may include a long training orthogonal frequency division multiplexing (OFDM) symbol. The L-LTF 1410 may be used for fine frequency/time synchronization and channel estimation.

The L-SIG 1420 may be used to transmit control information. The L-SIG 1420 may include information about a data transfer rate and a data length.

The HE-SIG A 1430 may include the ID information of an STA for indicating a target STA that will receive a downlink PPDU. An STA may determine whether or not to receive a PPDU based on the ID information of a target STA included in information included in the HE-SIG A 1430. If an STA is indicated based on the HE-SIG A 1430 of a downlink PPDU, the STA may perform additional decoding on the downlink PPDU. Furthermore, the HE-SIG A 1430 may include information about resources (frequency resources (or sub-band) (upon transmission based on orthogonal frequency division multiplexing (OFDMA)) or space-time stream resources (upon transmission based on multiple input multiple output (MIMO)) through which downlink data is to be received.

Furthermore, the HE-SIG A 1430 may include color bit information for identifying a BSS, bandwidth information, tail bits, CRC bits, modulation and coding scheme (MCS) information for the HE-SIG B 1460, symbol number information for the HE-SIG B 1460, and cyclic prefix (CP) (or guard interval (GI)) length information.

The HE-SIG A 1430 may include the aforementioned power management control bit included in the ACK frame. If the HE-SIG A 1430 includes the power management control bit included in the ACK frame, the MAC header of the ACK frame may not include a power management control bit. The HE-SIG A 1430 may include the aforementioned power management control bit included in the power management control frame. If the HE-SIG A 1430 includes the power management control bit included in the power management control frame, the MAC header of the power management control frame may not include a power management control bit.

The HE-STF 1440 may be used to improve automatic gain control estimation in an MIMO environment or OFDMA environment.

The HE-LTF 1450 may be used to estimate a channel in an MIMO environment or OFDMA environment.

The HE-SIG B 1460 may include information about the length modulation and coding scheme (MCS) of a physical layer service data unit (PSDU) for each STA and tail bits.

The size of inverse fast Fourier transform (IFFT) applied to the HE-STF 1440 and a field after the HE-STF 1440 and the size of IFFT applied to a field prior to the HE-STF 1440 may be different. For example, the size of IFFT applied to the HE-STF 1440 and a field after the HE-STF 1440 may be four times greater than the size of IFFT applied to a field prior to the HE-STF 1440. When an STA receives a downlink PPDU, the STA may decode the HE-SIG A 1430 of the PPDU, and may determine whether or not to decode a field subsequent to the HE-SIG A 1430 based on the ID information of a target STA included in the HE-SIG A 1430. In this case, if the ID information of the target STA included in the HE-SIG A 1430 indicates the ID of the STA, the STA may perform decoding based on an FFT size changed from the HE-STF 1440 and a field after the HE-STF 1440. In contrast, if the ID information of the target STA included in the HE-SIG A 1430 does not indicate the ID of the STA, the STA may stop decoding and perform a network allocation vector (NAV) configuration. The cyclic prefix (CP) of the HE-STF 1440 may have a greater size than the CP of another field. During such a CP, the STA may perform decoding on the downlink PPDU by changing the FFT size.

Order of the fields forming the PPDU format disclosed at the top of FIG. 14 may be changed. For example, as disclosed in the middle of FIG. 14, the HE-SIG B 1415 of an HE part may be located right after an HE-SIG A 1405. An STA may decode the HE-SIG A 1405 and the HE-SIG B 1415, may receive required control information, and may perform NAV setting. Likewise, the size of IFFT applied to an HE-STF 1425 and a field after the HE-STF 1425 may be different from the size of IFFT applied to a field prior to the HE-STF 1425.

An STA may receive the HE-SIG A 1405 and the HE-SIG B 1415. If the reception of the downlink PPDU of the STA is indicated based on the HE-SIG A 1405, the STA may change an FFT size from the HE-STF 1425 and perform decoding on the PPDU. In contrast, if the STA receives the HE-SIG A 1405 and the reception of the downlink PPDU is not indicated based on the HE-SIG A 1405, the STA may perform a network allocation vector (NAV) configuration.

Referring to the top of FIG. 14, there is disclosed a downlink PPDU format for downlink (DL) multi-user (MU) transmission. The downlink PPDU may be transmitted to an STA through different DL transmission resources (frequency resources or a spatial stream) based on OFDMA. That is, downlink data may be transmitted to a plurality of STAs through a plurality of subbands based on a downlink PPDU format for DL MU transmission. Although not disclosed in the aforementioned embodiment, an AP may transmit downlink data to a plurality of STAs based on a DL MU downlink PPDU format.

The fields prior to the HE-SIG B 1445 on the downlink PPDU may be transmitted in different DL transmission resources in a duplicated form. The HE-SIG B 1445 may be transmitted on the entire transmission resources in an encoded form. The fields after the HE-SIG B 1445 may include individual information for a plurality of STAs that receive a downlink PPDU.

If fields included in a downlink PPDU are transmitted through respective DL transmission resources, CRC for each of the fields may be included in the downlink PPDU. In contrast, if a specific field included in a downlink PPDU is encoded on the entire DL transmission resources and transmitted, CRC for each of fields may not be included in the downlink PPDU. Accordingly, overhead for CRC can be reduced. That is, a downlink PPDU format for DL MU transmission according to an embodiment of the present invention can reduce CRC overhead for a downlink frame using the HE-SIG B 1445 of an encoded form on the entire transmission resources.

Likewise, in a downlink PPDU format for DL MU transmission, the HE-STF 1455 and fields subsequent to the HE-STF 1455 may be encoded based on an IFFT size different from that of the fields prior to the HE-STF 1455. Accordingly, if the STA receives the HE-SIG A 1435 and the HE-SIG B 1445 and is instructed to receive a downlink PPDU based on the HE-SIG A 1435, the STA may perform decoding on a downlink PPDU by changing an FFT size from the HE-STF 1455.

Figure 15:
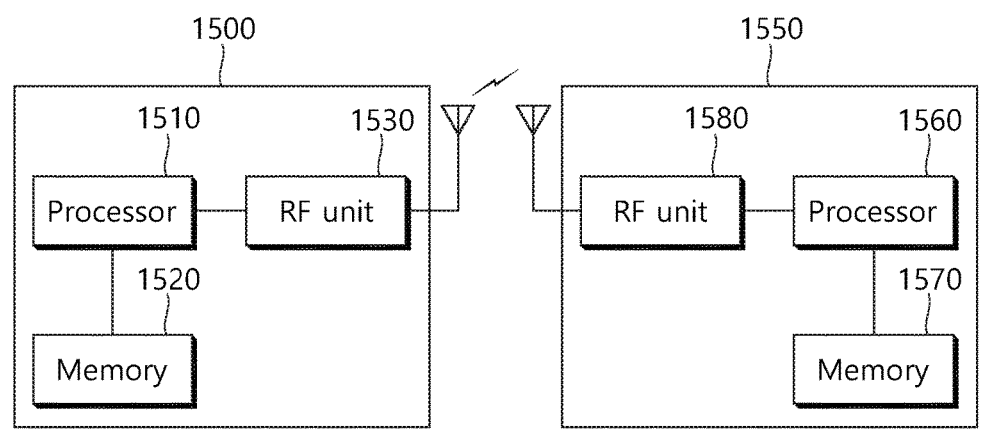
FIG. 15 is a block diagram showing a wireless apparatus to which an embodiment of the present invention may be applied.

FIG. 15 is a block diagram showing a wireless apparatus to which an embodiment of the present invention may be applied.

Referring to FIG. 15, the wireless apparatus 1500 is an STA capable of implementing the aforementioned embodiments, and may be an AP 1500 or a non-AP STA (or STA) 1550.

The AP 1500 includes a processor 1510, memory 1520, and a radio frequency (RF) unit 1530.

The RF unit 1530 is connected to the processor 1520 and may transmit/receive a radio signal.

The processor 1520 may implement the functions, processes and/or methods proposed in the present invention. For example, the processor 1520 may be implemented to perform the aforementioned operations of the wireless apparatus according to an embodiment of the present invention. The processor may perform the operations of the AP disclosed in the embodiments of FIGS. 1 to 14.

For example, the processor 1510 may be implemented to overhear another BSS frame and to transmit a power management control frame from the AP within a predetermined time after overhearing another BSS frame. The power management control frame may include information indicating whether or not to maintain the awake state of an STA.

The STA 1550 includes a processor 1560, memory 1570, and a radio frequency (RF) unit 1580.

The RF unit 1580 is connected to the processor 1560 and may transmit/receive a radio signal.

The processor 1560 may implement the functions, processes and/or methods proposed in the present invention. For example, the processor 1560 may be implemented to perform the aforementioned operations of the wireless apparatus according to an embodiment of the present invention. The processor may perform the operations of the wireless apparatus in the embodiments of FIGS. 1 to 14.

For example, the processor 1560 may be implemented to determine switching to the awake state based on the transmission cycle of a beacon frame, to transmit a PS-poll frame to an AP, and to receive an ACK frame from the AP in response to the PS-poll frame. Furthermore, the processor 1560 may be implemented to overhear another basic service set (BSS) frame after receiving an ACK frame and to determine whether or not to maintain the awake state based on whether a power management control frame has been transmitted by an AP within a predetermined time after overhearing another BSS frame.

The ACK frame may include information indicating the transmission of a power management control frame. Another BSS frame may be a frame transmitted by another BSS other than a BSS including an AP and an STA. The power management control frame may include information indicating whether or not to maintain the awake state of an STA.

Furthermore, the processor 1560 may be implemented to maintain the awake state when a power management control frame is received within a predetermined time and to determine to switch the state of an STA from the awake state to the doze state when a power management control frame is not received within a predetermined time. The time when the doze state is maintained may be determined based on TXOP duration information for another BSS frame.

The processor 1510, 1560 may include Application-Specific Integrated Circuits (ASICs), other chipsets, logic circuits, and/or data processors. The memory 1520, 1570 may include read-only memory (ROM), random access memory (RAM), flash memory, memory cards, storage media and/or other storage devices. The RF unit 1530, 1580 may include one or more antennas for transmitting and/or receiving a radio signal.

When an embodiment is implemented in software, the aforementioned scheme may be implemented using a module (process or function) which performs the aforementioned function. The module may be stored in the memory 1520, 1570 and executed by the processor 1510, 1560. The memory 1520, 1570 may be disposed to the processor 1510, 1560 internally or externally and connected to the processor 1510, 1560 using a variety of well-known means.

What is claimed is:
1. An operation method based on a power save mode in a wireless local area network (WLAN), the operation method comprising:
   switching, by a station (STA) in the power save mode, a power state of the STA from a doze state to an awake state based on a predetermined transmission cycle;
   receiving, by the STA, from an access point (AP) a beacon frame that includes traffic indication map (TIM) information regarding a presence of buffered downlink frame for the STA;
   transmitting, by the STA, a power saving (PS)-poll frame to an access point (AP) in response to the beacon frame;
   receiving, by the STA from the AP, an acknowledgement (ACK) frame in response to the PS-poll frame, the ACK frame including a power management control field that indicates that the power state of the STA is to be switched by the AP after receiving the ACK frame;
   overhearing, by the STA, another basic service set (BSS) frame according to the power management control field, wherein the another BSS frame is received from another AP belonging to another BSS other than a BSS to which the AP belongs;

determining, by the STA, whether a power management control frame is received from the AP within a predetermined time, wherein the power management control frame includes a state setting field indicating that the STA maintains the awake state, and wherein the power management control frame is received only when a reception intensity of the another BSS frame is smaller than a predetermined threshold level; and if the power management control frame is received within the predetermined time, maintaining, by the STA, the awake state according to the state setting field.

2. The operation method of claim 1, further comprising:
if the power management control frame is not received within the predetermined time, switching, by the STA, from the awake state to the doze state, wherein the doze state is maintained during a time interval that is determined based on transmission opportunity (TXOP) duration information for the another BSS frame.

3. The operation method of claim 1, wherein:
the power management control frame is transmitted by the AP at a predetermined inter-frame space between the power management control frame and the another BSS frame if reception intensity of the another BSS frame received by the AP is smaller than the predetermined threshold level, and the power management control frame is not transmitted by the AP if the reception intensity of the another BSS frame received by the AP is greater than or equal to the predetermined threshold level.

4. A station (STA) operating based on a power save mode in a wireless local area network (WLAN), the STA comprising:
a radio frequency (RF) unit including a transceiver and antenna implemented to transmit or receive a radio signal; and
a processor operatively connected to the RF unit,
wherein the processor is implemented to:
switch a power state of the STA from a doze state to an awake state based on a predetermined transmission cycle, receive from an access point (AP) a beacon frame that includes traffic indication map (TIM) information regarding a presence of buffered downlink frame for the STA, transmit a power saving (PS)-poll frame to an access point (AP) in response to the beacon frame, receive from the AP an acknowledgement (ACK) frame in response to the PS-poll frame, the ACK frame including a power management control field that indicates that the power state of the STA is to be switched by the AP after receiving the ACK frame, overhear another basic service set (BSS) frame according to the power management control field, wherein the another BSS frame is received from another AP belonging to another BSS other than a BSS to which the AP belongs, determine whether a power management control frame is received from the AP within a predetermined time, wherein the power management control frame includes a state setting field indicating that the STA maintains the awake state, and wherein the power management control frame is received only when a reception intensity of the another BSS frame is smaller than a predetermined threshold level, and if the power management control frame is received within the predetermined time, maintain the awake state according to the state setting field.

5. The STA of claim 4, wherein:
the processor is further implemented to switch from the awake state to the doze state if the power management control frame is not received within the predetermined time, wherein the doze state is maintained during a time interval that is determined based on transmission opportunity (TXOP) duration information for the another BSS frame.

6. The STA of claim 4, wherein:
the power management control frame is transmitted by the AP at a predetermined inter-frame space between the power management control frame and the another BSS frame if reception intensity of the another BSS frame received by the AP is smaller than the predetermined threshold level, and the power management control frame is not transmitted by the AP if the reception intensity of the another BSS frame received by the AP is greater than or equal to the predetermined threshold level.

* * * * *